US010626732B2

(12) United States Patent
Matsuo et al.

(10) Patent No.: US 10,626,732 B2
(45) Date of Patent: Apr. 21, 2020

(54) BLADE AND GAS TURBINE INCLUDING THE SAME

(71) Applicant: MITSUBISHI HITACHI POWER SYSTEMS, LTD., Kanagawa (JP)

(72) Inventors: Saki Matsuo, Yokohama (JP); Tomoko Morikawa, Yokohama (JP); Satoshi Hada, Yokohama (JP); Hiroyuki Otomo, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 259 days.

(21) Appl. No.: 15/557,670

(22) PCT Filed: Mar. 11, 2016

(86) PCT No.: PCT/JP2016/057715
§ 371 (c)(1),
(2) Date: Sep. 12, 2017

(87) PCT Pub. No.: WO2016/152573
PCT Pub. Date: Sep. 29, 2016

(65) Prior Publication Data
US 2018/0045060 A1  Feb. 15, 2018

(30) Foreign Application Priority Data
Mar. 26, 2015 (JP) ................................ 2015-064939

(51) Int. Cl.
*F01D 5/18* (2006.01)
*F01D 9/02* (2006.01)
(Continued)

(52) U.S. Cl.
CPC ............... *F01D 5/187* (2013.01); *F01D 9/02* (2013.01); *F01D 25/12* (2013.01); *F02C 7/18* (2013.01);
(Continued)

(58) Field of Classification Search
CPC .......... F01D 25/12; F01D 25/24; F01D 5/187; F01D 9/02; F01D 5/188; F01D 5/189;
(Continued)

(56) References Cited

U.S. PATENT DOCUMENTS 4,946,346 A   8/1990 Ito
5,609,466 A   3/1997 North et al.
(Continued)

FOREIGN PATENT DOCUMENTS

EP   1384855    1/2004
EP   2 562 358   2/2013
(Continued)

OTHER PUBLICATIONS

International Search Report dated May 24, 2016 in International Application No. PCT/JP2016/057715, with English translation.
(Continued)

*Primary Examiner* — Carl C Staubach
(74) *Attorney, Agent, or Firm* — Wenderoth, Lind & Ponack, L.L.P.

(57) ABSTRACT

A blade has a flow passage forming plate that defines a part of a combustion gas flow passage. The flow passage forming plate has a plurality of back channels that open in a back end surface. A density of openings of the plurality of back channels in a middle region of the back end surface is higher than the density of openings of the plurality of back channels in at least one side region of a suction-side region and a pressure-side region of the back end surface. The density of openings is a ratio of a length of wetted perimeter of the plurality of back channels to an interval of openings of the plurality of back channels.

17 Claims, 19 Drawing Sheets

(51) Int. Cl.
    *F02C 7/18*     (2006.01)
    *F01D 25/12*     (2006.01)
    *F01D 25/24*     (2006.01)
    *F02C 3/04*     (2006.01)

(52) U.S. Cl.
CPC ............... *F01D 25/24* (2013.01); *F02C 3/04* (2013.01); *F05D 2220/32* (2013.01); *F05D 2240/35* (2013.01); *F05D 2240/60* (2013.01); *F05D 2240/81* (2013.01); *F05D 2260/201* (2013.01)

(58) Field of Classification Search
CPC .......... F02C 3/04; F02C 7/18; F05D 2220/32; F05D 2240/35; F05D 2240/60; F05D 2240/81; F05D 2260/201; F05D 2240/80
See application file for complete search history.

(56) References Cited

U.S. PATENT DOCUMENTS

| | | | |
|---|---|---|---|
| 6,196,799 B1 * | 3/2001 | Fukue | F01D 5/186 |
| | | | 416/97 R |
| 8,641,377 B1 | 2/2014 | Liang | |
| 2001/0021343 A1 | 9/2001 | Kuwabara et al. | |
| 2004/0018082 A1 | 1/2004 | Soechting et al. | |
| 2005/0111965 A1 | 5/2005 | Lowe et al. | |
| 2013/0171005 A1 * | 7/2013 | Ellis | F01D 5/187 |
| | | | 416/97 R |
| 2016/0169515 A1 * | 6/2016 | Tu | F23R 3/005 |
| | | | 60/806 |
| 2018/0202301 A1 * | 7/2018 | Otomo | F01D 9/04 |
| 2019/0010809 A1 * | 1/2019 | Matsuo | F01D 5/18 |
| 2019/0032499 A1 * | 1/2019 | Matsuo | F01D 5/187 |

FOREIGN PATENT DOCUMENTS

| | | | | |
|---|---|---|---|---|
| EP | 2562358 A1 * | 2/2013 | ............. | F01D 11/24 |
| EP | 2610436 | 7/2013 | | |
| JP | 2862536 | 3/1999 | | |
| JP | 11-166401 | 6/1999 | | |
| JP | 2001-254605 | 9/2001 | | |
| JP | 2004-060638 | 2/2004 | | |
| JP | 2005-146858 | 6/2005 | | |
| JP | 2005-155626 | 6/2005 | | |
| JP | 2008-286157 | 11/2008 | | |
| JP | 2010-031753 | 2/2010 | | |
| JP | 2011-241836 | 12/2011 | | |
| JP | 2013-139772 | 7/2013 | | |
| WO | 2011/132217 | 10/2011 | | |

OTHER PUBLICATIONS

Written Opinion of the International Searching Authority dated May 24, 2016 in International Application No. PCT/JP2016/057715.

* cited by examiner p3 > p2 > p1

US 10,626,732 B2

BLADE AND GAS TURBINE INCLUDING THE SAME

TECHNICAL FIELD

The present invention relates to a blade and a gas turbine including the same.

The present application claims priority based on Japanese Patent Application No. 2015-064939 filed on Mar. 26, 2015, the contents of which are incorporated herein by reference.

BACKGROUND ART

A gas turbine includes a rotor that rotates around an axis and a casing that covers this rotor. The rotor has a rotor shaft and a plurality of rotor blades mounted on this rotor shaft. A plurality of stator blades are provided on the inner side of the casing.

The rotor blade has a blade body extending in the radial direction of the axis, a platform provided on the radially inner side of the blade body, and a blade root provided on the radially inner side of the platform. The blade body of the rotor blade is disposed in a combustion gas flow passage through which combustion gas passes. The platform defines the position of the combustion gas flow passage on the radially inner side. The blade root is fixed to the rotor shaft. The stator blade has a blade both extending in the radial direction of the axis, an inner shroud provided on the radially inner side of the blade body, and an outer shroud provided on the radially outer side of the blade both. The blade body of the stator blade is disposed in the combustion as flow passage through which the combustion gas passes. The inner shroud defines the position of the combustion gas flow passage on the radially inner side. The outer shroud defines the position of the combustion gas flow passage on the radially outer side.

Both the stator blades and the rotor blades of the gas turbine are exposed to high-temperature combustion gas. Therefore, these stator blades and rotor blades are commonly cooled with air etc.

For example, various cooling channels through which cooling air passes are formed in the stator blade described in Patent Literature 1. Specifically, a cavity which extends in the radial direction and into which cooling air flows is formed in the blade body of this stator blade. A plurality of discharge holes that communicate with the cavity of the blade body and extend in the direction of the chord of the blade body are formed in the inner shroud and the outer shroud. These discharge holes are open in a back end surface of the inner shroud and a back end surface of the outer shroud. The plurality of discharge holes are arrayed in the circumferential direction relative to the axis.

CITATION LIST

Patent Literature

Patent Literature Japanese Patent No. 2862536

SUMMARY OF INVENTION

Technical Problem

For the stator blades and the rotor blades of a gas turbine, it is desired to improve the durability of these blades by effectively cooling them, and at the same time to reduce as much as possible the amount of air used to cool these blades.

Therefore, an object of the present invention is to provide a blade that makes it possible to improve the durability and at the same time to reduce the amount of cooling air used, and a gas turbine including this blade.

Solution to Problem

A blade as a first aspect according to the present invention to achieve the above object is a blade of a gas turbine on the inside of which a combustion gas flow passage having an annular shape around a rotor shaft and extending in an axial direction in which the rotor shaft extends is formed, the blade including: a blade body that is disposed in the combustion gas flow passage through which combustion gas flows, and extends in a radial direction of the rotor shaft; and a flow passage forming plate that is formed at an end of the blade body in the radial direction and defines a part of the) combustion gas flow passage. The flow passage forming plate has: a back end surface that is an end surface on a downstream side in the axial direction in which the combustion gas flows; a pressure-side end surface that is an end surface on a circumferential pressure side that is a pressure side of the blade body in a circumferential direction of the rotor shaft a suction-side end surface that is an end surface on a circumferential suction side that is the opposite side from the circumferential pressure side: a cavity into which cooling air flows; and a plurality of back channels that communicate with the cavity and open in the back end surface. Openings of a plurality of the back channels arrayed in the circumferential direction are formed in each of a middle region of the back end surface that does not include an edge of the suction-side end surface and an edge of the pressure-side end surface, a suction side region of the back end surface that includes the edge of the suction-side end surface and is adjacent to the middle region in the circumferential direction, and a pressure-side region of the back end surface that includes the edge of the pressure-side end surface and is adjacent to the middle region in the circumferential direction. A density of openings of the plurality of back channels in the middle region is higher than the density of openings of the plurality of back channels in at least one side region of the suction-side region and the pressure-side region, the density of openings being a ratio of a length of wetted perimeter of the plurality of back channels to an interval of openings of the plurality of back channels.

The length of a flow passage of the combustion gas flowing along a suction-side surface of the blade body is longer than the length of a flow passage of the combustion gas flowing along a pressure-side surface of the blade body. Accordingly, the flow velocity of the combustion gas flowing along the suction-side surface of the blade body is higher than the flow velocity of the combustion gas flowing along the pressure-side surface of the blade body. After flowing along the suction-side surface of the blade body, the combustion gas flows at high flow velocity also in a part of the gas path surface of the flow passage forming plate that is a part located closer to the back end surface and in the middle in the circumferential direction. Thus, the suction-side surface of the blade body, and the part of the gas path surface of the flow passage forming plate that is located closer to the back end surface and in the middle in the circumferential direction have higher heat transfer coefficients for the combustion gas, and are heated by the combustion gas more than the other parts. Conversely, parts of the gas path surface of the flow passage forming plate that are parts located closer to the back end surface and on the end sides in the circumferential direction are heated by the combustion gas to a less extent than the middle part in the circumferential direction.

In this blade, therefore, the density of openings of the plurality of back channels in the middle region is set to be higher than the density of, openings in at least one side region of the suction-side region and the pressure-side region. As a result, in this blade, cooling performance in the part of the gas path surface of the flow passage forming plate that is located closer to the back end surface and in the middle in the circumferential direction can be enhanced, and thus the durability of the blade can be improved. Moreover, in this blade, the total flow rate of cooling air flowing through the plurality of back channels present in the parts of the gas path surface al the flow passage forming plate that are located closer to the back end surface and on the end sides in the circumferential direction can be reduced.

A blade as a second aspect according to the present invention to achieve the above object is the blade of a gas turbine of the first aspect, wherein the density of openings in the middle region is higher than the density of openings in the suction-side region.

A blade as a third aspect according to the present invention to achieve the above object is the blade al a gas turbine of the first aspect, wherein the density of openings in the middle region is higher than the density of openings in the suction-side region and the density of openings in the pressure-side region.

A blade as a fourth aspect according: to the present invention to achieve the above object is the blade of a gas turbine according to any one al the first to third aspects, wherein the density of openings in the pressure-side region is higher than the density of openings in the suction-side region.

A blade as a fifth aspect according to the present invention to achieve the above object is the blade of a gas turbine according to any one of the first to fourth aspects, wherein openings of at least three or more back channels arrayed in the circumferential direction are formed in each of the suction-side region and the pressure-side region.

A blade as a sixth aspect according to the present invention to achieve the above object is the blade of a gas turbine according to any one of the first to fifth aspects, wherein the flow passage forming plate has: a back header channel that extends along the back end surface in the circumferential direction and communicates with the plurality of back channels; a suction-side channel that extends along the suction-side end surface in a direction having, a component of the axial direction and provides communication between the cavity and the back header channel; and a pressure-side channel that extends along the pressure-side end surface in a direction having a component of the axial direction and, provides communication between the cavity and the back header channel.

A blade as a seventh aspect according to the present invention to achieve the above object is the blade of a gas turbine of the sixth aspect, wherein the flow passage forming plate has; a gas path surface that connects to the back end surface, the pressure-side end surface, and the suction-side end surface at peripheral edges and comes in contact with the combustion gas; and a plurality of gas path surface blowout channels that communicate with the back header channel and open in the gas path surface.

In this blade, the gas path surface can he further cooled with cooling air flowing through the gas path surface blowout channels.

A blade as an eighth aspect according to the present invention to achieve the above object is the blade of a gas turbine according to any one of the first to seventh aspects, wherein the flow passage forming plate has: a gas path surface that connects to the back end surface, the pressure-side end surface, and the suction-side end surface at peripheral edges and comes in contact with the combustion gas; and a plurality of gas path surface blowout channels that communicate with the cavity and open in the gas path surface.

In this blade, the gas path surface can he further cooled with cooling air flowing through the gas path, surface blowout channels.

A blade as a ninth aspect according to the present invention to achieve the above object is the blade of a gas turbine of the seventh or eighth aspect, wherein the gas path surface blowout channels are gradually directed toward the downstream side in the axial direction as the gas path surface blowout channels approach the gas path surface.

In this blade, the gas path surface of the flow passage forming plate can be film-cooled with cooling air flowing out from the gas path surface blowout channels.

A blade as a tenth aspect according to the present invention to achieve the above object is the blade of a gas turbine of any one of the first to ninth aspects, including, for the flow passage forming plate, a plurality of the blade bodies arrayed in the circumferential direction.

A blade as an eleventh aspect according to the present invention to achieve the above object is the blade of a gas turbine of the tenth aspect, wherein the density of openings in blade downstream regions is higher than the density of openings in an inter-blade region, the inter-blade region being a region of the middle region that includes a region between the plurality of blade bodies, the blade downstream regions being regions of the middle region that are located on the downstream side in the axial direction relative to the blade bodies and do not include the inter-blade region.

A blade as a twelfth aspect according to the present invention to achieve the above object is the blade of a gas turbine according to any one of the first to eleventh aspects, including, as the flow passage forming plate, an outer shroud that is formed at an end of the blade body on the outer side in the radial direction, and an inner shroud that is formed at an end of the blade body on the inner side in the radial direction, wherein the outer shroud is fixed to a easing of the gas turbine.

A blade as a thirteenth aspect according to the present invention to achieve the above object is the blade of a gas turbine of any one of the first to eleventh aspects, wherein the, flow passage forming plate is a platform that is formed at an end of the blade body on the inner side in the radial direction, and the platform is fixed to the rotor shaft.

A gas turbine as a fourteenth aspect according to the present invention to achieve the above object includes: the blade of any one of the first to thirteenth aspects:, a combustor in which the combustion gas is generated as fuel is combusted; the rotor shaft; and a casing that covers the rotor shaft and the blade.

Advantageous Effects of invention

According to one aspect of the present invention, it is possible to improve the durability of a blade by effectively cooling the blade, and at the same time to reduce the amount of cooling air used.

DESCRIPTION OF EMBODIMENTS

In the following, embodiments and modified examples thereof of the present invention will be described in detail with reference to the drawings.

Embodiment of Gas Turbine

An embodiment of a gas turbine will be described with reference to FIG. 1 and FIG. 2.

Figure 1:
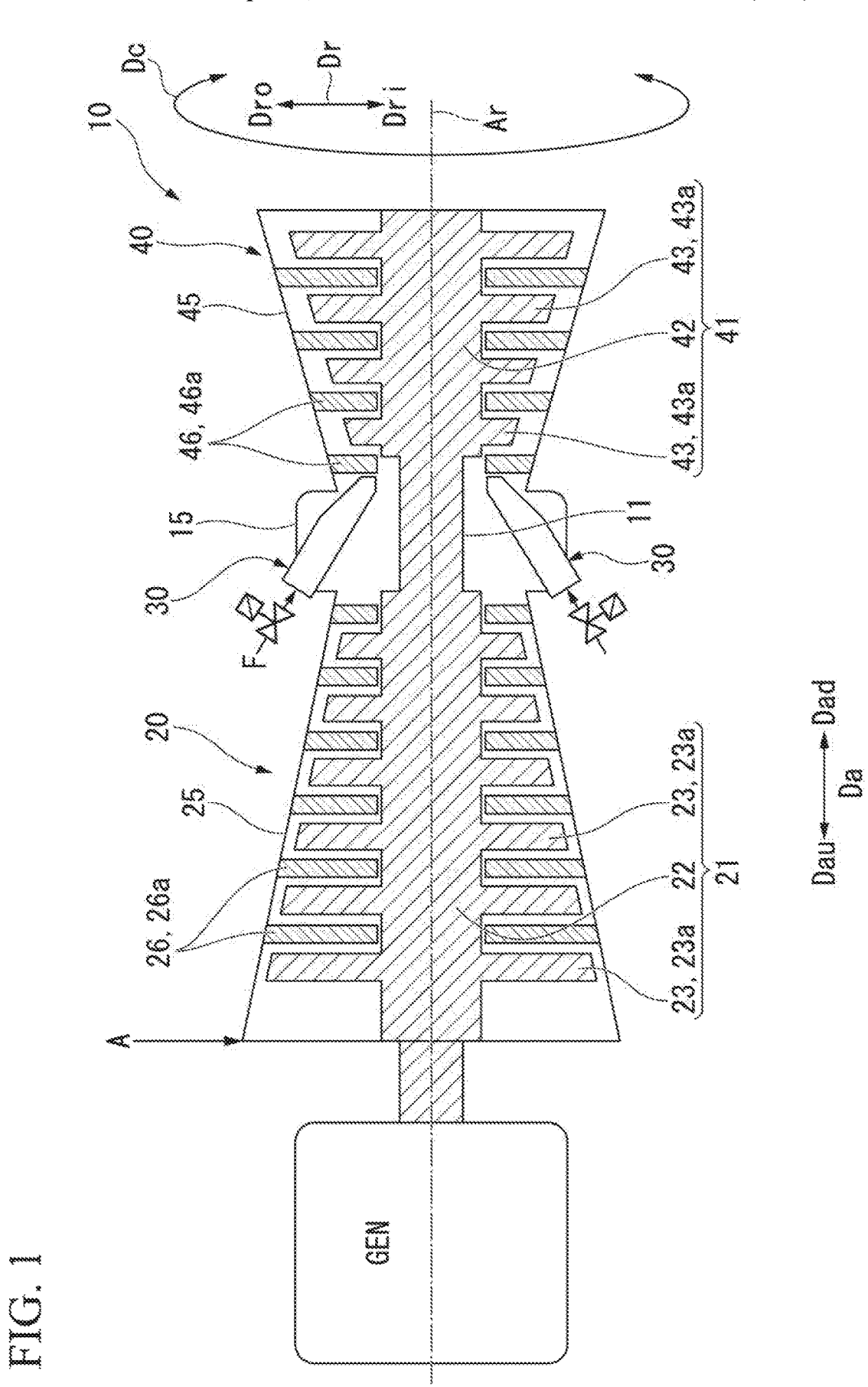
FIG. 1 is a schematic sectional view of a gas turbine in an embodiment according to the present invention.

As shown in FIG. 1, a gas turbine 10 of this embodiment includes a compressor 20 that compresses air, a combustor 30 that generates combustion gas by combusting fuel in air A compressed by the compressor 20, and a turbine 40 driven by the combustion gas.

The compressor 20 has a compressor rotor 21 that rotates around an axis Ar, a compressor casing 25 that covers the compressor rotor 21, and a plurality of stator blade stages 26. The turbine 40 has a turbine rotor 41 that rotates around the axis Ar, turbine casing 45 that covers the turbine rotor 41, and a plurality of stator blade stages 46.

The compressor rotor 21 and the turbine rotor 41 are located on the same axis Ar and connected to each other to form a gas turbine rotor 11. For example, a rotor of a generator GEN is connected to the gas turbine rotor 11. The compressor casing 25 and the turbine casing 45 are connected to each other to form a gas turbine casing 15. Hereinafter, a direction in which the axis Ar extends will be referred to as an axial direction Da. A circumferential direction around the axis Ar will be referred to simply as a circumferential direction Dc, and a direction perpendicular to the axis Ar will be referred to as a radial direction Dr. In the axial direction Da, the side of the compressor 20 relative to the turbine 40 will be referred to as an upstream side Dau, and the opposite side' will he referred to as a downstream side Dad. In the radial direction Dr, the side closer to the axis Ar will be referred to as a radially inner side Dri, and the opposite side will be referred to as a radially outer side Dro.

The compressor rotor 21 has a rotor shaft 22 extending in the axial direction Da around the axis Ar, and a plurality of rotor blade stages 23 mounted on the rotor shaft 22. The plurality of rotor blade states 23 are arrayed in the axial direction Da. Each rotor blade stage 23 is composed of a plurality of rotor blades 23a arrayed in the circumferential direction De. The stator blade stage 26 is disposed on the downstream side Dad of each of the plurality of rotor blade stages 23. The stator blade stages 26 are provided on the inner side of the compressor casing 25. Each stator blade stage 26 is composed of a plurality of stator blades 26a arrayed in the circumferential direction Dc.

Figure 2:
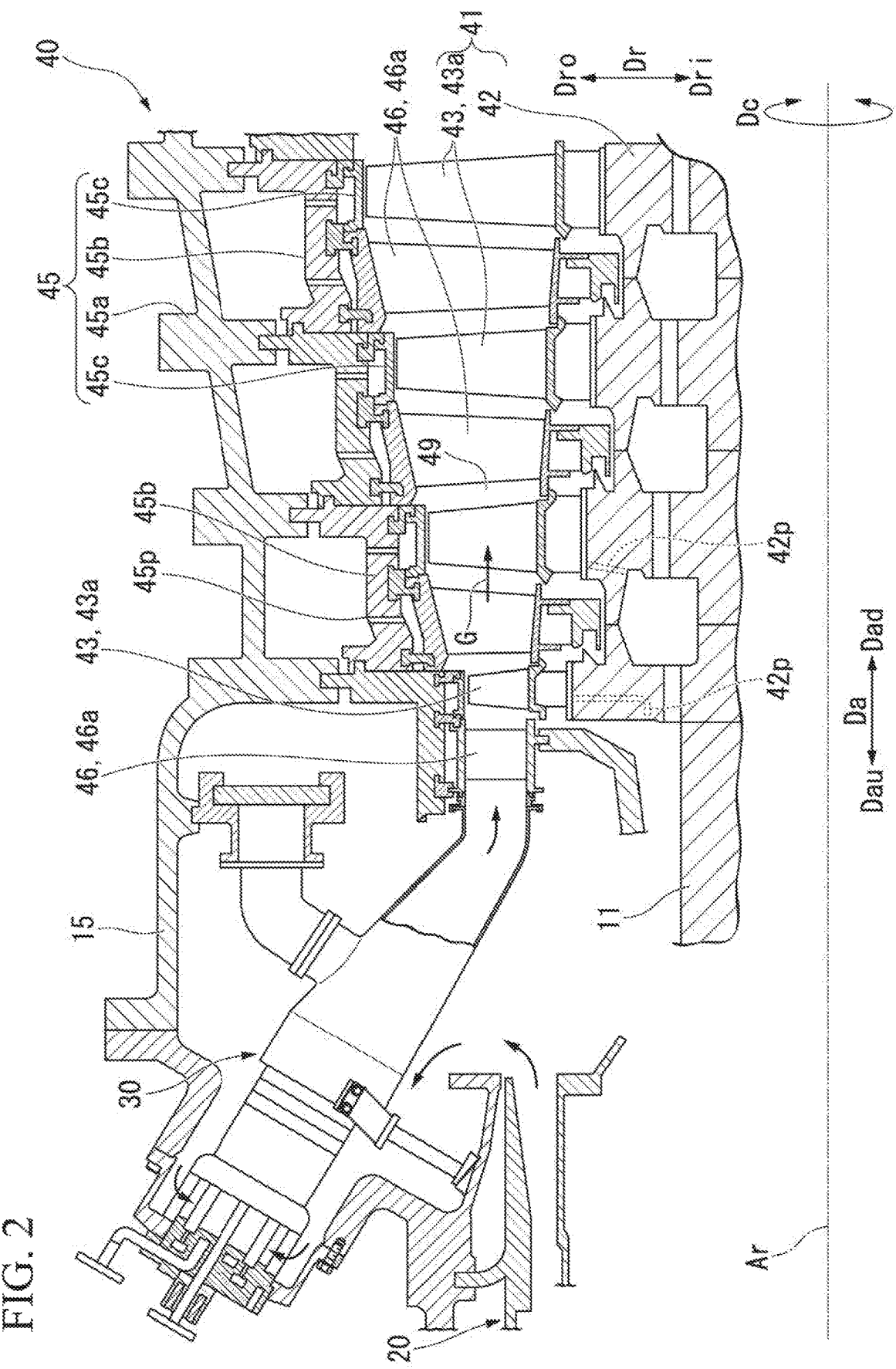
FIG. 2 is a sectional view of main parts of the gas turbine in the embodiment according to the present invention.

As shown in FIG. 2, the turbine rotor 41 has a rotor shaft 42 extending in the axial direction Da around the axis Ar, and a plurality of rotor blade stages 43 mounted on the rotor shaft 42. The plurality of rotor blade stages 43 are arrayed in the axial direction Da. Each rotor blade stage 43 is composed of a plurality of rotor blades 43a arrayed in the circumferential direction Dc. The stator blade stage 46 is disposed on the upstream side Dau of each of the plurality of rotor blade stages 43. The stator blade stages 46 are provided on the inner side of the turbine casing 45. Each stator blade stage 46 is composed of a plurality of stator blades 46a arrayed in the circumferential direction Dr. The turbine casing 45 has a cylindrical outer casing 45a constituting an outer shell of the turbine casing 45, an inner casing 45b fixed on the inner side of the outer casing 45a, and a plurality of ring segments 45c fixed on the inner side of the inner casing 45b. Each ring segment 45c is provided between adjacent ones of the plurality of stator blade stages 46. Thus, the rotor blade stage 43 is disposed on the radially inner side Dri of the ring segments 45c.

An annular space which is located between the outer circumferential side of the rotor shaft 42 and the inner circumferential side of the turbine casing 45 and in which the stator blades 46a and the rotor blades 43a are disposed in the axial direction Da forms a combustion gas flow passage 49 through which combustion gas G from the combustor 30 flows. The combustion gas flow passage 49 has an annular shape around the axis Ar and is long in the axial direction Da. In the rotor shaft 42, cooling air channels 42p through which cooling air passes are formed. Cooling air having passed through the cooling air channels 42p is introduced into the rotor blades 43a and used to cool the rotor blades 43a. In the inner casing 45b of the turbine easing 45, cooling air channels 45p extending through the inner casing 45b from the radially outer side Dro to the radially inner side Dri are formed. Cooling air having passed through the cooling air channels 45p is introduced into the stator blades 46a and the ring segments 45c and used to cool the stator blades 46a and the ling segments 45c. Depending on the stator blade stage 46, air inside the gas turbine casing 15 may be supplied as cooling air to the stator blades 46a composing this stator blade stage 46 without passing through the cooling air channels of the casing.

In the following, various embodiments of a blade that is either the stator blade 46a or the rotor blade 43a having been described above will be described.

First Embodiment of Blade

A first embodiment of the blade according to the present invention will be described below with reference to FIG. 3 to FIG. 5.

The blade of this embodiment is a stator blade of a gas turbine. As shown in FIG. 3, a stator blade 50 has a blade body 51 extending in the radial direction Dr, an inner shroud 60i formed on the radially inner side Dri of the blade body 51, and an outer shroud 60o formed on the radially outer side Dro of the blade body 51. The blade body 51 is disposed in the combustion gas flow passage 49 (see FIG. 2) through which the combustion gas G passes. The inner shroud 60i defines the position of the annular combustion gas flow passage 49 on the radially inner side Dri. The outer shroud 60o defines the position of the annular combustion gas flow passage 49 on the radially outer side Dro. Thus, both the inner shroud 60i and the outer shroud 60o are flow passage forming plates that define a part of the combustion gas flow passage 49.

Figure 4:
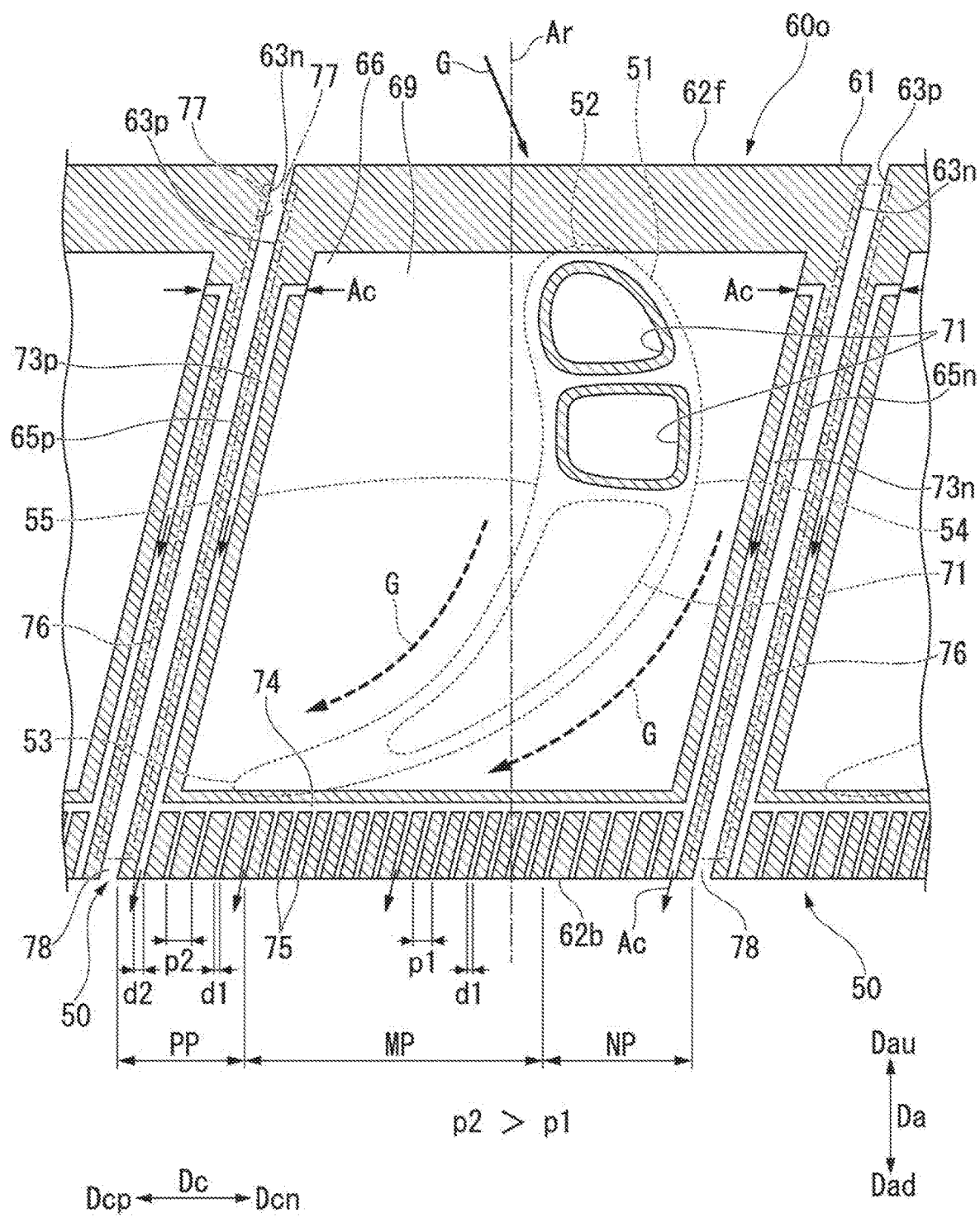
FIG. 4 is a sectional view taken along the line IV-IV of FIG. 3.

As shown in FIG. 4, an end of the blade body 51 on the upstream side Dau forms a leading edge 52, and an end thereof on the downstream side Dad forms a trailing edge 53. Of surfaces of the blade body 51 facing the circumferential direction Dc, a convex surface forms a suction-side surface 54 (negative pressure surface) and a concave surface forms a pressure-side surface 55 (positive pressure surface). For the convenience of the following description, the pressure side (positive pressure-surface side) of the blade body 51 and the suction side (negative pressure-surface side) of the blade body 51 in the circumferential direction Dc will be referred to as a circumferential pressure side Dcp and a circumferential suction side Dcn, respectively. The upstream side Dau in the axial direction Da and the downstream side Dad in the axial direction Da may be referred to as a front side and a back side, respectively.

The inner shroud 60i and the outer shroud 60o have basically the same structure. Therefore, the outer shroud 60o will be described below.

Figure 3:
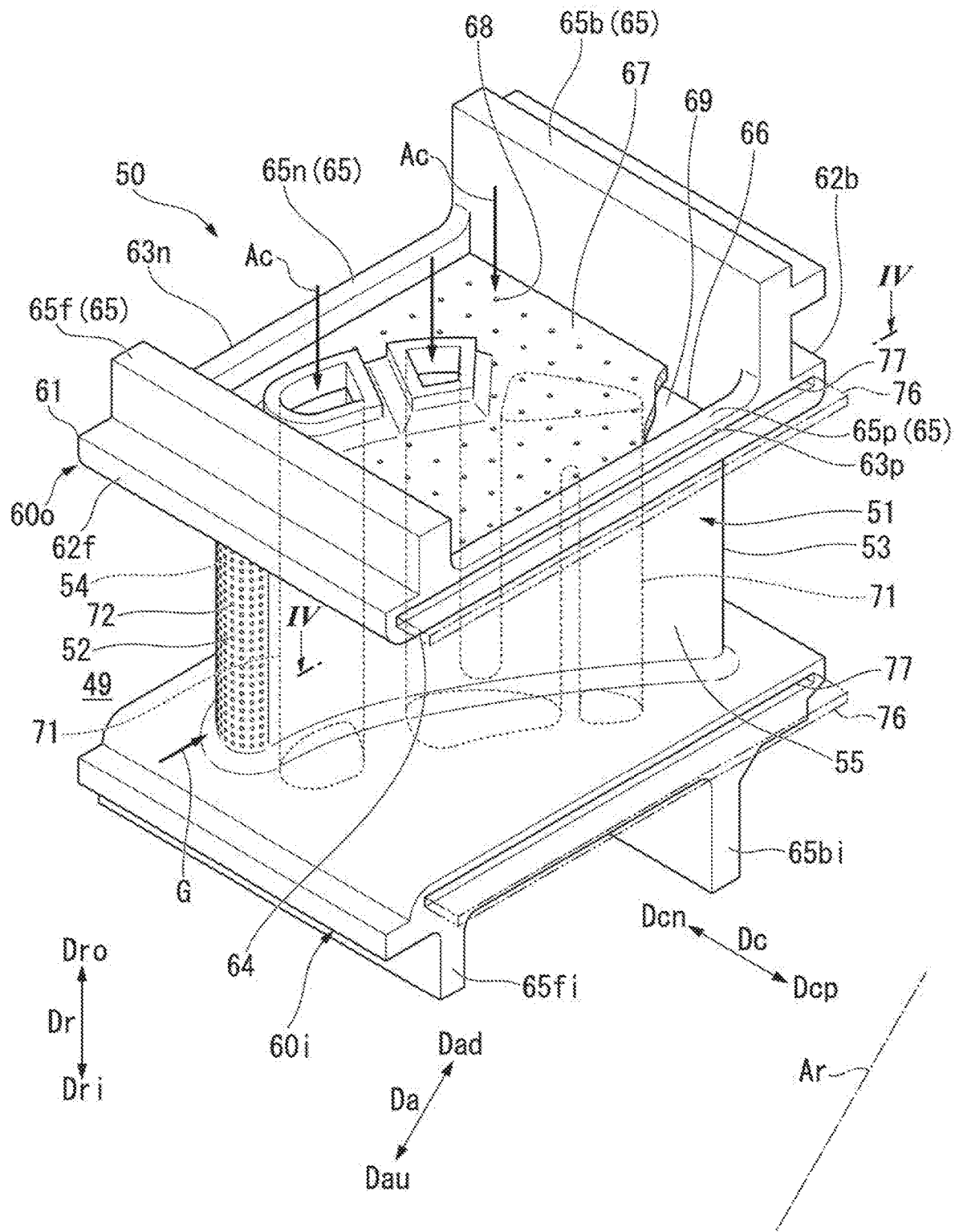
FIG. 3 is a perspective view of a stator blade in a first embodiment according to the present invention.

As shown in FIG. 3 and FIG. 4, the outer shroud 60o has a plate-like outer shroud main body 61 that spreads in the axial direction Da and the circumferential direction Dc, and a peripheral wall 65 that extends along outer peripheral edges of the outer shroud main body 61 and protrudes from the outer shroud main body 61 toward the radially outer side Dro.

The outer shroud main body 61 has a front end surface 62f being an end surface on the upstream side Dau, a back end surface 62b being an end surface on the downstream side Dad, a pressure-side end surface 63p being an end surface on the circumferential pressure side Dcp, a suction-side, end surface 63n being an end surface on the circumferential suction side Dcn, and a gas path surface 64 facing the radially inner side Dri. The front end surface 62f and the back end surface 62b are nearly parallel to each other. The pressure-side end surface 63p and the suction-side end surface 63n are nearly parallel to each other. Thus, when seen from the radial direction Dr, the outer shroud main body 61 has a parallelogram shape as shown in FIG. 4. A seal groove 77 that is recessed toward the suction-side end surface 63n and extends along the pressure-side end surface 63p in a direction having a component of the axial direction Da is formed in the pressure-side end surface 63p of the outer shroud 60o. A seal groove 77 that is recessed toward the pressure-side end surface 63p and extends along the suction-side end surface 63n in a direction having a component of the axial direction Da is formed in the suction-side end surface 63n of the outer shroud 60o. Of the outer shrouds 60o of two stator blades 50 adjacent to each other in the circumferential direction De, the pressure-side end surface 63p of the outer shroud 60o of one stator blade 50 and the suction-side end surface 63n of the outer shroud 60o of the other stator blade 50 face each other with a clearance 78 left therebetween in the circumferential direction Dc. A seal plate 76 is disposed between the pressure-side end surface 63p of the outer shroud 60o of the one stator blade 50 and the suction-side end surface 63n of the outer shroud 60o of the other stator blade 50. Both ends of the seal plate 76 in the circumferential direction Dc are fitted into the seal groove 77 formed in the pressure-side end surface 63p and the seal groove 77 formed in the suction-side end surface 63n. The seal plate 76 serves to prevent cooling air inside the turbine casing 45 or cooling air having passed through the cooling air channels 42p from leaking out into the combustion gas flow passage 49 through the clearance 78 between the outer shrouds 60o of two stator blades 50 adjacent to each other in the circumferential direction Dc.

The peripheral wall 65 includes a front peripheral wall 65f and a back peripheral wall 65b facing each other in the axial direction Da, and a pair of side peripheral walls 65p, 65n facing each other in the circumferential direction Dr. Both the from peripheral wall 65f and the back peripheral wall 65b protrude from the outer shroud main body 61 farther toward the radially outer side Dro than the pair of side peripheral walls 65p, 65n, and thus form hooks. The front peripheral wall 65f and the back peripheral wall 65b forming the hooks are used to mount the stator blade 50 on the inner, circumferential side of the turbine casing 45 (see FIG. 2). In the outer shroud 60o, a recess 66 recessed toward the radially inner side Dri is furred by the outer shroud main body 61 and the peripheral wall 65.

The stator blade 50 further includes an impingement plate 67 that partitions the recess 66 of the outer shroud 60o into a region on the radially outer side Dro and an inner cavity 69 (cavity) that is a region on the radially inner side Dri. In the impingement plate 67, a plurality of air holes 68 extending through the impingement plate 67 in the radial direction Dr are formed. Part of cooling air Ac present on the radially outer side Dro of the stator blade 50 flows into the inner cavity 69 through the air holes 68 of the impingement plate 67.

A plurality of blade air channels 71 (cavities) extending in the radial direction Dr are formed inside the blade body 51, the outer shroud 60o, and the inner shroud 60i. Each blade air channel 71 is formed continuously from the outer shroud 60o through the blade body 51 to the inner shroud 60i. The plurality of blade air channels 71 are arrayed along a blade chord of the blade body 51. Some of the adjacent blade air channels 71 communicate with each other at a part on the radially outer side Dro or a part on the radially inner side Dri. Some of the plurality of blade air channels 71 are open at a bottom of the recess 66 in the outer shroud 60o. Some of the plurality of blade air channels 71 are open at a bottom of a recess in the inner shroud 60i. Part of the cooling air Ac present on the radially outer side Dro or the radially inner side Dri of the stator blade 50 flows into the blade air channels 71 through openings of these blade air channels 71.

In the leading edge 52 and the trailing edge 53 of the blade body 51, a plurality of blade surface blowout channels 72 extending through these edges from the blade air channels 71 to the combustion gas flow passage 49 are formed. The blade body 51 is cooled in the process of the cooling air Ac flowing through the blade air channels 71. The cooling air Ac having flowed into the blade air channels 71 flows out from the blade surface blowout channels 72 into the combustion gas flow passage 49. Thus, the leading edge 52 and the trailing edge 53 of the blade body 51 are cooled in the process of the cooling air Ac flowing out from the blade surface blowout channels 72. Moreover, part of the cooling air Ac having flowed out from the blade surface blowout channels 72 into the combustion gas flow passage 49 serves also as film air by partially covering a surface of the blade body 51.

As shown in FIG. 4, a pressure-side channel 73*p* extending along the pressure-side end surface 63*p* in a direction having a component of the axial direction Da is formed in the side peripheral wall 65*p* on the pressure side of the pair of side peripheral walls 65*p*, 65*n* of the outer shroud 60*o*. A suction-side channel 73*n* extending along the suction-side end surface 63*n* in a direction having a component of the axial direction Da is formed in the side peripheral wall 65*n* on the suction side. Both the pressure-side channel 73*p* and the suction-side channel 73*n* communicate with the inner cavity 69 at their upstream ends. Both the pressure-side channel 73*p* and the suction-side channel 73*n* are open in the back end surface 62*b* of the outer shroud main body 61 at their downstream ends. A back header channel 74 extending along the back end surface 62*b* in the circumferential direction De is formed in the outer shroud main body 61. An end of the back header channel 74 on the circumferential pressure side Dcp is connected to the pressure-side channel 73*p*. An end of the back header channel 74 on the circumferential suction side Den is connected to the suction-side channel 73*n*. Thus, the back header channel 74 communicates with the pressure-side channel 73*p* and the suction-side channel 73*n*. Moreover, a plurality of back channels 75 extending from the back header channel 74 toward the downstream side Dad and opening in the back end surface 62*b* are formed in the outer shroud main body 61. The plurality of back channels 75 are arrayed in the circumferential direction Dc. Portions of the pressure-side channel 73*p* and the suction-side channel 73*n* that are located on the downstream side Dad from the positions at which these channels communicate with the back header channel 74 constitute back channels 75 that open in the back end surface 62*b*.

All the back channels 75 including the pressure-side channel 73*p* and the suction-side channel 73*n* have a circular cross-sectional shape. Inner diameters d1 of the back channels 75 except for the pressure-side channel 73*p* and the suction-side channel 73*n* are equal to one another and smaller than inner diameters d2 of the pressure-side channel 73*p* and the suction-side channel 73*n*. Accordingly, lengths of wetted perimeter s1 of the back channels 75 except for the pressure-side channel 73*p* and the suction-side channel 73*n* are equal to one another and shorter than lengths of wetted perimeter s2 of the pressure-side channel 73*p* and the suction-side channel 73*n*. A length of wetted perimeter s refers to the length of a wall surface in contact with a fluid in a flow passage cross-section. For example, in the case of a circular flow passage cross-section, the length of wetted perimeter s is the circumferential length of the circle.

Here, a region of the back end surface 62*b* of the outer shroud main body 61 that does not include an edge of the suction-side end surface 63*n* and an edge of the pressure-side end surface 63*p* will be referred to as a middle region MP. A region of the back end surface 62*b* that includes the edge of the suction-side end surface 63*n* and is adjacent to the middle region MP in the circumferential direction Dc will be referred to as a suction-side region NP. A region of the back end surface 62*b* that includes the edge of the pressure-side end surface 63*p* and is adjacent to the middle region MP in the circumferential direction Dc will be referred to as a pressure-side region PP. In each of the regions MP, NP, PP, openings of three or more back channels 75 arrayed in the circumferential direction Dc are formed.

The interval of openings of the plurality of back channels 75 in the middle region MP is p1. The interval of openings of the plurality of back channels 75 in the suction-side region NP and the interval of opening of the plurality of back channels 75 in the pressure-side region PP are p2. The interval of openings p1 of the plurality of back channels 75 in the middle region MP is smaller than the interval of openings p2 of the plurality of back channels 75 in the suction-side region NP and the pressure-side region P.

Figure 5:
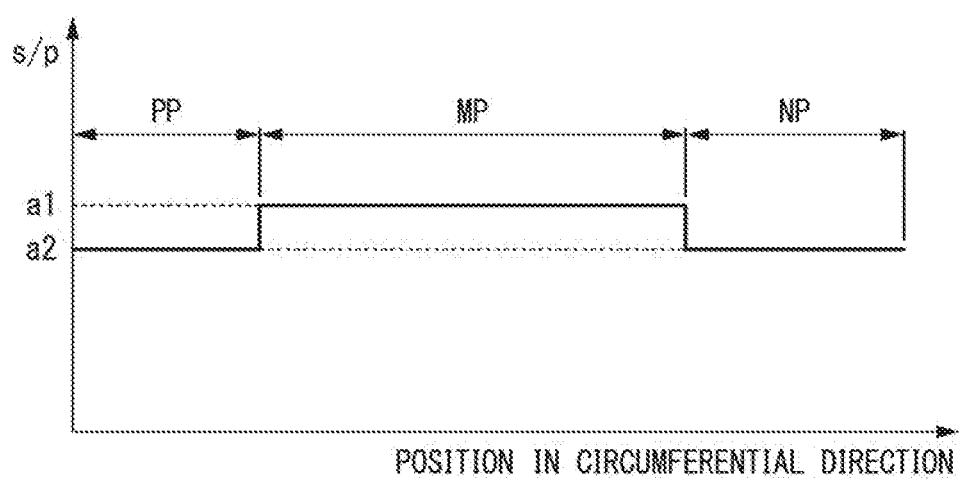
FIG. 5 is a graph showing a density of openings at each position in a back end surface of the stator blade in the first embodiment according to the present invention.

Thus, when the ratio of the length of wetted perimeter s of the plurality of back channels 75 to the interval of openings p of the plurality of back channels 75 is defined as the density of openings (s/p), as shown in FIG. 5, a density of openings a1 (t=s1/p1) of the plurality of back channels 75 in the middle region MP is higher than a density of openings a2 (=s1/p2 or s2/p2) of the plurality of back channels 75 in the pressure-side region PP and the suction-side region NP.

The cooling air Ac having flowed into the inner cavity 69 flows into the pressure-side channel 73*p* and the suction-side channel 73*n*. The cooling air Ac having flowed into the pressure-side channel 73*p* cools a part of the outer shroud main body 61 that is located closer to the pressure-side end surface 63*p* in the process of flowing through the pressure-side channel 73*p*. The cooling air Ac having flowed into the suction-side channel 73*n* cools a part of the outer shroud main body 61 that is located closer to the suction-side end surface 63*n* in the process of flowing through the suction-side channel 73*n*.

Part of the cooling air Ac having flowed into the pressure-side channel 73*p* and the suction-side Channel 73*n* flows into the back header channel 74. The cooling air Ac having flowed into the back header channel 74 flows into the plurality of back channels 75. The cooling air Ac having flowed into the back channels 75 flows to the outside from the back end surface 62*b* of the outer shroud 60*o*. The cooling air Ac cools a part of the outer shroud main body 61 that is located closer to the back end surface 62*b* in the process of flowing through the back channels 75 including the pressure-side channel 73*p* and the suction-side channel 73*n*.

As shown in FIG. 4, the length of a flow passage of the combustion gas G flowing along the suction-side surface 54 of the blade body 51 is longer than the length of a flow passage of the combustion gas G flowing along the pressure-side surface 55 of the blade body 51. Accordingly, the flow velocity of the combustion gas G flowing along the suction-side surface 54 of the blade body 51 is higher than the flow velocity of the combustion gas G flowing along the pressure-side surface 55 of the blade body 51. After flowing along the suction-side surface 54 of the blade body 51, the combustion gas G maintains the high flow velocity also in a part of the gas path surface 64 of the outer shroud 60*o* that is a part located closer to the back end surface 62*b* and in the middle in the circumferential direction Dc. Thus, the suction-side surface 54 of the blade body 51, and the part of the gas path surface 64 of the outer shroud 60*o* that is located closer to the back end surface 62*b* and in the middle in the circumferential direction Dc have high heat transfer coefficients for the combustion gas G, and are heated by the combustion gas G more than the other parts.

The cooling air Ac having flowed from the pressure-side channel 73p and the suction-side channel 73n into the back header channel 74 is gradually heated through heat exchange with the combustion gas G as the cooling air Ac flows farther away from the pressure-side channel 73p and the suction-side channel 73n. Specifically, as the cooling air Ac flows farther away from the pressure-side channel 73p and the suction-side channel 73n, in other words, as the cooling air Ac approaches a middle part of the back header channel 74 in the circumferential direction Dc, the temperature of the cooling air Ac flowing through the back, header channel 74 rises gradually due to a heat input from the combustion gas G flowing along the gas path surface 64. Thus, the temperature of the cooling air Ac flowing through those back channels 75 of the plurality of back channels 75 that are open in the middle region MP of the back end surface 62b is higher than the temperature of the cooling air Ac flowing through those back channels 75 that are open in the pressure-side region PP and the suction-side region NP of the back end surface 62b. Accordingly, the cooling performance of the cooling air Ac flowing through one back channel 75 opening in the middle region MP is lower than the cooling performance of the cooling air Ac flowing through one back channel 75 opening in the pressure-side region PP or the suction-side region NP.

As has been described above, the part of the gas path surface 64 of the outer shroud 60o that is located closer to the back end surface 62b and in the middle in the circumferential direction. Dc is heated by the combustion gas G more easily than the other parts. Moreover, the cooling performance of the cooling air Ac flowing through one back channel 75 present in this middle part is lower than the cooling performance of the cooing air Ac flowing through one back channel 75 present in another part. Conversely, parts of the gas path surface 64 of the outer shroud 60o that are parts located closer to the back end surface 62b and on the end sides in the circumferential direction Dc are heated by the combustion gas G less easily than the middle part in the circumferential direction Dc. Moreover, the cooling performance of the cooling air Ac flowing through one back channel 75 present in one of the parts of the gas path surface 64 of the outer shroud 60o that are located closer to the back end surface 62b and on the end sides in the circumferential direction Dc is higher than the cooling performance of the cooling air Ac flowing through one back channel 75 present in the middle part in the circumferential direction Dc.

In this embodiment, therefore, the density of openings a1 (=s1/p1) of the plurality of back channels 75 in the middle region MP is set to be higher than the density of openings a2 (=s1/p2 or s2/p2) of the plurality of back channels 75 in the pressure-side region PP and the suction side region NP. As a result, in this embodiment, the cooling performance in the part of the gas path surface 64 of the outer shroud 60o that is located closer to the back end surface 62b and in the middle in the circumferential direction Dc can be enhanced, and thus the durability of the blade can be improved. Moreover, in this embodiment, the total flow rate of the cooling air Ac flowing through the plurality of back channels 75 present in the parts of the gas path surface 64 of the outer shroud 60o that are located closer to the back end surface 6n and on the end sides in the circumferential direction Dc can be reduced.

As described above, the cooling air Ac flowing through the back header channel 74 is gradually heated up and degrades in cooling performance as the cooling air Ac flows farther away from the pressure-side channel 73p and the suction-side channel 73n. In this embodiment, however, the cooling air Ac having degraded in cooling performance is reused, which has a beneficial effect in that the amount of cooling air can be reduced. Specifically, as described above, the cooling air Ac having flowed into the inner cavity 69 through the air holes 68 of the impingement plate 67 impinges on a surface forming the inner cavity 69 and impingement-cools this surface. As a result, the gas path surface 64 facing this surface is cooled. Moreover, the cooling air Ac after impingement cooling passes from the pressure-side channel 73p and the suction-side channel 73n to the back header channel 74 and is discharged into the combustion gas flow passage 49 through the openings of the back channels 75 in the back end surface 62b, and cools these channels in the process.

Because of the shape of the blade body 51, the relative position of the trailing edge 53 of the blade body 51 in the gas path surface 64 of the outer shroud 60o, etc., the pressure-side region PP of the gas path surface 64 of the outer shroud 60o that is located on the downstream side Dad relative to the trailing edge 53 of the blade body 51 and closer to the pressure-side end surface 63 is cooled to some extent with part of the cooling air Ac flowing out from the trailing edge 53 of the blade body 51.

Thus, in this embodiment, it is possible to suppress a rise in surface temperature and improve the durability of the outer shroud 60o by effectively cooling the part of the gas path surface 64 of the outer shroud 60o located closer to the back end surface 62b, and at the same time to reduce the flow rate of the cooling air Ac for cooling this part. Moreover, in this embodiment, as described above, the flow rate of the cooling air Ac can be further reduced by recycling the cooling air Ac. As a result, in this embodiment, the thermal efficiency of the gas turbine as a whole can be improved through a reduction of the flow rate of the cooling air Ac.

In FIG. 5, the density of openings a2 (=s1/p2 or s2/p2) of the plurality of back channels 75 in the pressure-side region PP and the suction-side region NP is constant in these regions PP, NP. However, the density of openings may be somewhat varied in the regions PP, NP, as long as the density of openings a2 is lower than the density of openings a1. In the pressure-side region PP and the suction-side region NP, the pressure-side channel 73p and the suction-side channel 73n that are parts of the plurality of back channels 75, and the back channels 75 that are different from these channels 73p, 73n in inner diameter coexist. Accordingly, it is possible that the density of openings of the plurality of back channels 75 in the pressure-side region PP and the suction-side region NP may somewhat vary in these regions PP, NP. Therefore, in the following embodiments, too, the density of openings of the plurality of back channels 75 in the pressure-side region PP and the suction-side region NP may be somewhat varied in these regions PP, NP.

In the above embodiment, the inner diameters d2 of the back channels 75 forming the portions of the pressure-side channel 73p and the suction-side channel 73n extending on the downstream side Dau from the back header channel 74 are larger than the inner diameters d1 of the back channels 75 in the middle region MP. However, the inner diameters d2 of the back channels 75 forming the portions of the pressure-side channel 73p and the suction-side channel 73n extending on the downstream side Dau from the back header channel 74 may be equal to the inner diameters d1 of the back channels 75 in the middle region MP. However, to prevent the back channels 75 on the downstream side Dau from being clogged with foreign substances such as rust contained in the cooling air flowing through the pressure-side channel 73p or the suction-side channel 73n, and to allow the foreign substances to be easily discharged to the downstream side Dau, it is desirable that, as in this embodiment, the inner diameters d2 of the back channels 75 forming the portions of the pressure-side channel 73p and the suction-side channel 73n extending on the downstream side Dau from the back header channel 74 are larger than the inner diameters d1 of the back channels 75 in the middle region MP.

Although the above description is intended for the outer shroud 60o, the same description is also applicable to the inner shroud 60i.

Second Embodiment of Blade

A second embodiment of the blade according to the present invention will be described below with reference to FIG. 6 and FIG. 7.

The blade of this embodiment is also a stator blade of a gas turbine. The configuration of the stator blade of this embodiment is the same as that of the blade of the first embodiment, except that the channels inside the outer shroud 60o and the inner shroud 60i through which the cooling air Ac passes are changed from those of the first embodiment.

Figure 6:
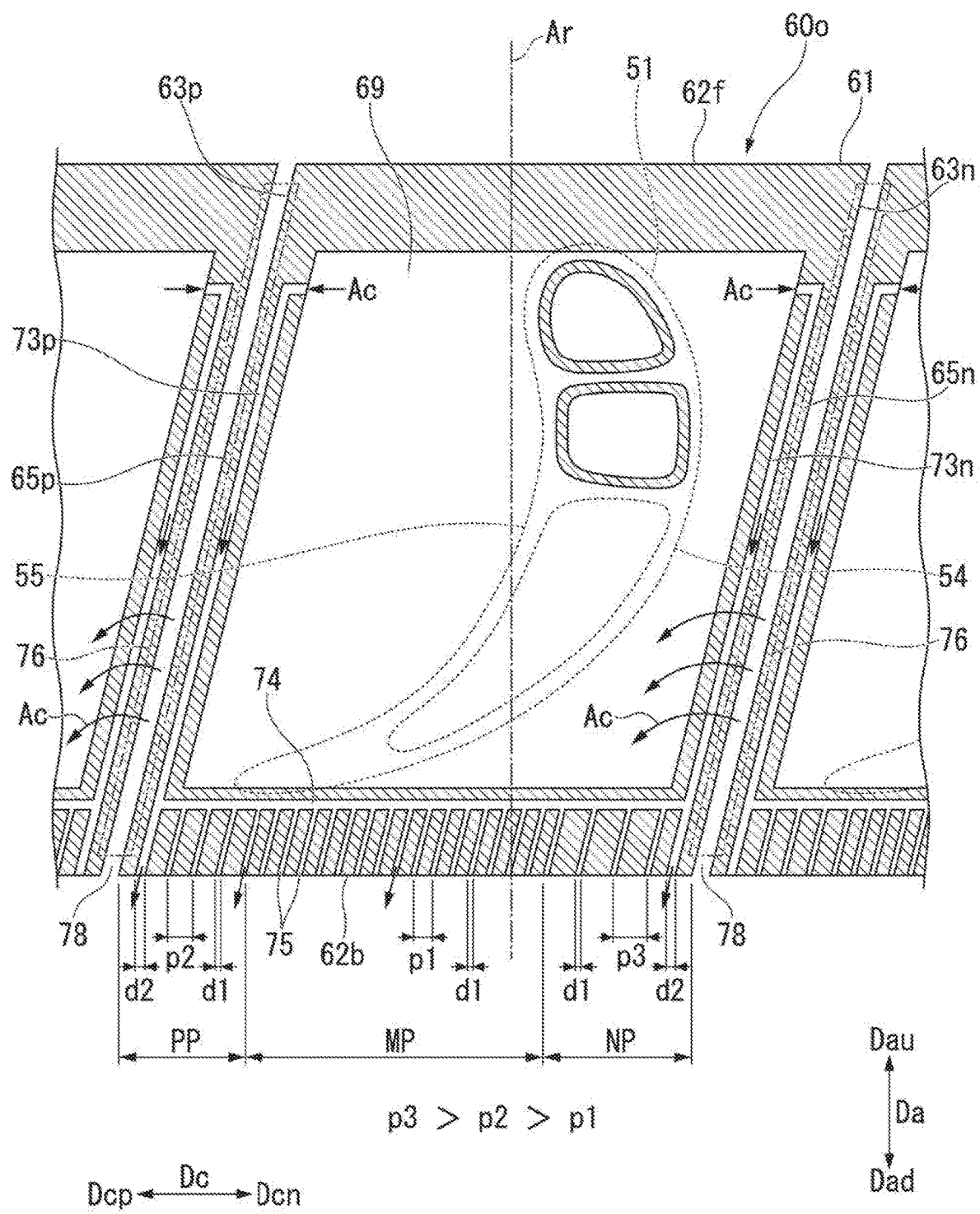
FIG. 6 is a sectional view of a stator blade in a second embodiment according to the present invention.

As shown in FIG. 6, in the outer shroud 60o of this embodiment, too, the pressure-side channel 73p, the suction-side channel 73n, the back header channel 74, and the plurality of back channels 75 are formed as with the blade of the first embodiment.

As in the first embodiment, the suction-side surface 54 of the blade body 51, and the part of the gas path surface 64 of the outer shroud 60o that is located closer to the back end surface 62b and in the middle in the circumferential direction Dc have higher heat transfer coefficients for the combustion gas G, and are heated by the combustion gas G more than the other parts.

In this embodiment, too, the inner diameters of the back channels 75 except for the pressure-side channel 73p and the suction-side channel 73n are d1 and smaller than the inner diameters d2 of the pressure-side channel 73p and the suction-side channel 73n. Accordingly, the lengths of wetted perimeter s1 of the back channels 75 except for the pressure-side channel 73p and the suction-side channel 73n are shorter than the lengths of wetted perimeter s2 of the pressure-side channel 73p and the suction-side channel 73n.

In this embodiment, as in the first embodiment, the interval, of openings of the plurality of back channels 75 in the middle region MP is p1. As in the first embodiment, the interval of openings of the plurality of back channels 75 in the pressure-side region PP is p2 (>p1). The interval of openings of the plurality of back channels 75 in the suction-side region NP is p3, which is larger than the interval of openings p2 of the plurality of back channels 75 in the pressure-side region PP.

Figure 7:
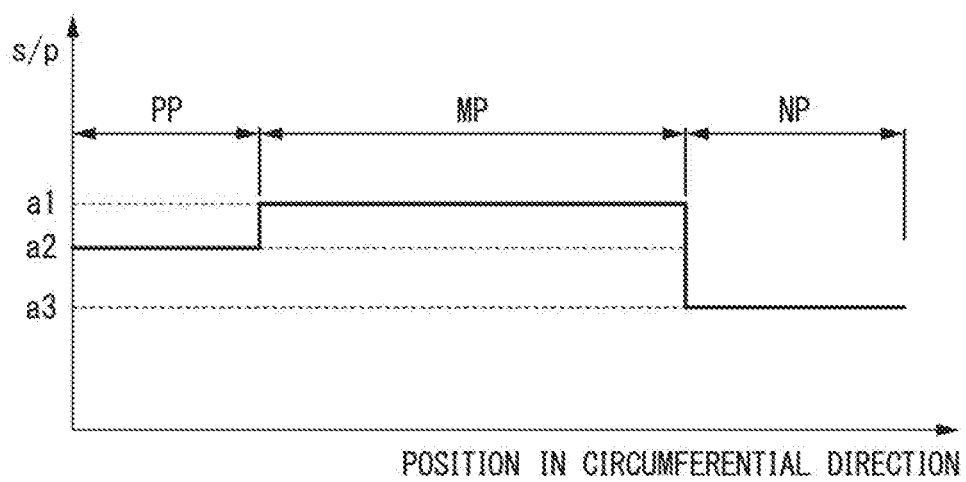
FIG. 7 is a graph showing the density of openings at each position in a back end surface of the stator blade in the second embodiment according to the present invention.

Accordingly, as shown in FIG. 7, the density of openings a1 (=s1/p1) of the plurality of back channels 75 in the middle region MP is higher than the density of openings a2 (=s1/p2 or s2/p2) of the plurality of back channels 75 in the pressure-side region PP as in the first embodiment. Moreover, in this embodiment, the density of openings a3 (=s1/p3 or s2/p3) of the plurality of back channels 75 in the suction-side region NP is lower than the density of openings a2 (=s1/p2 or s2/p2) of the plurality of back channels 75 in the pressure-side region PP.

As in the first embodiment, the seal plate 76 that seals the cooling air Ac is disposed in the clearance 78 between the outer shrouds 60o adjacent to each other in the circumferential direction Dc. In a normal operation state, to prevent the combustion gas G from flowing toward the gas turbine casing 15, the pressure of air in the gas turbine casing 15 and the cooling air channels 42p is adjusted to be higher than the pressure of the combustion gas flowing through the combustion gas flow passage 49. In the normal operation state, therefore, a small amount of cooling air Ac constantly flows into the combustion gas flow passage 49 through the clearance 78 between the adjacent outer shrouds 60o. This cooling air Ac flows through a slight clearance between the seal plate 76 disposed in the clearance 78 between the adjacent outer shrouds 60o and the seal grooves 77 of the outer shrouds 60o. The combustion gas G flowing between the blades flows along the suction-side surface 54 and the pressure-side surface 55 of the blade body 51. As described above, the flow velocity of the combustion gas G flowing along the suction-side surface 54 is higher than the flow velocity of the combustion gas G flowing along the pressure-side surface 55. Accordingly, the pressure (static pressure) is lower in a suction-side region where the combustion gas G flows along the suction-side surface 54 than in a pressure-side region along the pressure-side surface 55. Thus, the differential pressure between the cooling air Ac leaking out into the combustion gas G via the clearance 78 and the combustion gas G flowing in the suction-side region is higher than the differential pressure between the cooling air Ac leaking out through the clearance 78 and the combustion gas flowing in the pressure-side region. Accordingly, most of the cooling air Ac leaking out into the combustion gas G via the clearance 78 flows along the gas path surface 64 into the suction-side region on the downstream side where the pressure is lower. As a result, the part of the gas path surface 64 of the outer shroud 60o that is located closer to the back end surface 62b and on the circumferential suction side Dcn is subjected to the influence of the cooling air Ac flowing into the combustion gas flow passage 49, and is cooled more than a part of the gas path surface 64 of the outer shroud 60o that is located closer to the back end surface 62b and on the circumferential pressure side Dcp.

As in the first embodiment, the cooling air Ac having flowed into the pressure-side channel 73p and the suction-side channel 73n flows into the hack header channel 74, and flows to the outside from the back end surface 62b of the outer shroud 60o through the plurality of back channels 75. As in the first embodiment, the cooling performance of this cooling air Ac degrades as the cooling air Ac is heated up in the process of flowing through the back header channel 74.

As described above, in this embodiment, the part of the gas path surface 64 of the outer shroud 60o that is located closer to the back end surface 62b and on the circumferential suction side Dcn is cooled more than the part of the gas path surface 64 of the outer shroud 60o that is located closer to the back end surface 62b and on the circumferential pressure side Dcp. In this embodiment, therefore, the density of openings a3 (=s1/p3 or s2/p3) of the plurality of back channels 75 in the suction-side region NP is set to he lower than the density of openings a2 (=s1/p2 or s2/p2) of the plurality of back channels 75 in the pressure-side region PP. As a result, in this embodiment, the total flow rate of the cooling air Ac flowing through the plurality of back channels 75 present in the parts of the gas path surface 64 of the outer shroud 60o that are located closer to the back end surface 62b and on the end sides in the circumferential direction Dc can be reduced.

As in the first embodiment, in the normal operation state, a small amount of cooling air Ac constantly flows into the combustion gas flow passage 49 through the clearance 78 between the adjacent outer shrouds 60o as described above. However, depending on the arrangement or posture of the seal plate 76 inside the seal grooves 77 in the normal operation state, a larger amount of air may flow out into the combustion gas flow passage 49 through the slight clearance between the seal grooves 77 and the seal plate 76. This embodiment is employed in such cases.

Third Embodiment of Blade

A third embodiment of the blade according to the present invention will be described below with reference to FIG. 8 and FIG. 9.

The blade of this embodiment is also a stator blade of a gas turbine. The configuration of the stator blade of this embodiment is the same as that of the blade of the first embodiment, except that the channels inside the outer shroud 60o and the inner shroud 60i through which the cooling air Ac passes are changed from those of the first embodiment.

Figure 8:
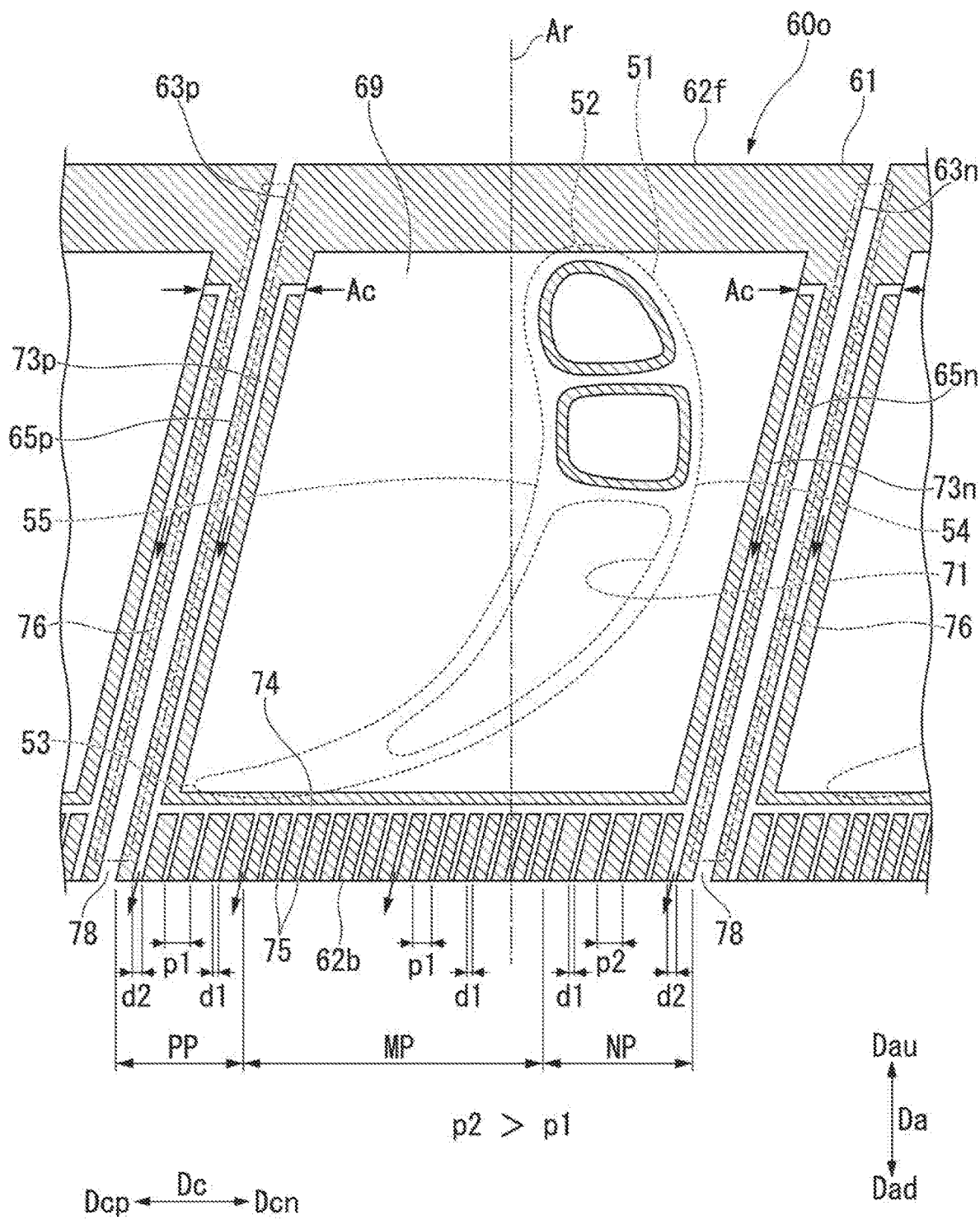
FIG. 8 is a sectional view of a stator blade in a third embodiment according to the present invention.

As shown in FIG. 8, in the outer shroud 60o of this embodiment, too, the pressure-side channel 73p, the suction-side channel 73n, the back header channel 74, and the plurality of back channels 75 are formed as with the blade of the first embodiment.

In this embodiment, too, the inner diameters of the back channels 75 except for the pressure-side channel 73p and the suction-side channel 73n are d1 and smaller than the inner diameters d2 of the pressure-side channel 73p and the suction-side channel 73n. Accordingly, the lengths of wetted perimeter s1 of the back channels 75 except for the pressure-side channel 73p and the suction-side channel 73n are shorter than the lengths of wetted perimeter s2 of the pressure-side channel 73p and the suction-side channel 73n.

In this embodiment, as in the first embodiment, the interval of openings of the plurality of back channels 75 in the middle region MP is p1. As in the first embodiment, the interval of openings of the plurality of back channels 75 in the suction-side region NP is p2 (>p1). The interval of openings of the plurality of back channels 75 in the pressure-side region PP is p1, which is equal to the interval of openings p1 of the plurality of back channels 75 in the middle region MP.

Figure 9:
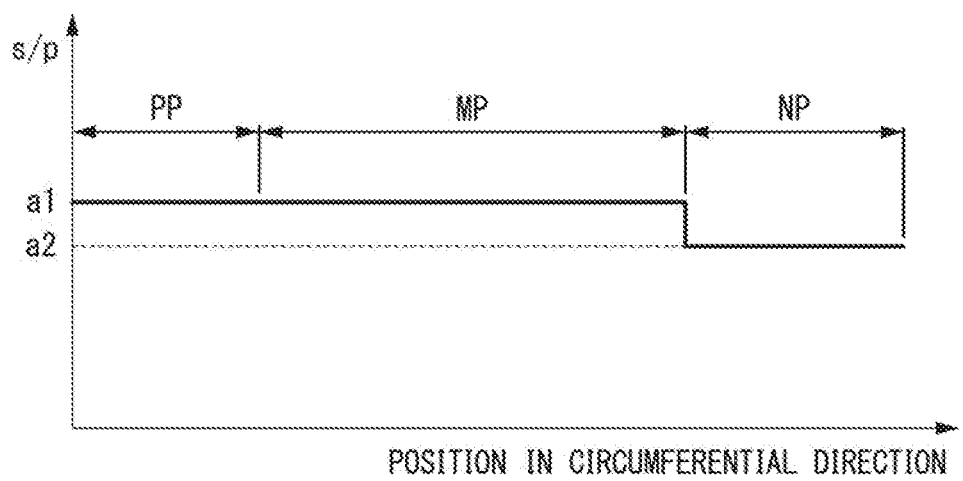
FIG. 9 is a graph showing the density of openings at each position in a back end surface of the stator blade in the third embodiment according to the present invention.

Thus, as shown in FIG. 9, the density of openings a1 (=s1/p1) of the plurality of back channels 75 in the middle region MP is higher than the density of openings a2 (=s1/p2 or s2/p2) of the plurality of back channels 75 in the suction-side region NP as in the first embodiment. Moreover, in this embodiment, the density of openings a1 (=(s1/p1 or s2/p1) of the plurality of back channels 75 in the pressure-side region PP is substantially equal to the density of openings a1 (=s1/p1) of the plurality of back channels 75 in the middle region P. Accordingly, the density of openings a1 (=s1/p1 or s2/p1) of the plurality of back channels 75 in the pressure-side region PP is higher than the density of openings a2 (=s1/p2 or s2/p2) of the plurality of back channels 75 in the suction-side region NP.

As described using FIG. 3, air having flowed from the blade air channels 71 of the blade body 51 into the blade surface blowout channels 72 of the blade body 51 flows out from the leading edge 52 and the trailing edge 53 of the blade body 51 into the combustion gas flow passage 49. Part of the cooling air Ac having flowed out from the trailing edge 53 of the blade body 51 cools not only the blade body 51 but also the part of the gas path surface 64 of the outer shroud 60o that is located on the downstream side Dad relative to the trailing edge 53 of the blade body 51. However, unlike in the first embodiment, due to the shape of the blade body 51, the relative position of the trailing edge 53 of the blade body 51 in the gas path surface 64 of the outer shroud 60o, etc., it is not always possible to sufficiently cool the part of the gas path surface 64 of the outer shroud 60o that is located on the downstream side Dad relative to the trailing edge 53 of the blade body 51 with the part of the cooling air Ac flowing out from the trailing edge 53 of the blade body 51.

In this embodiment, with such cases taken into account, the density of openings a1 (=s1/p1 or s2/p1) of the plurality of back channels 75 in the pressure-side region PP is set to be higher than the density of openings a2 (=s1/p2 or s2/p2) of the plurality of back channels 75 in the suction-side region NP. As a result, in this embodiment, even when the part of the gas path surface 64 of the outer shroud 60o that is located on the downstream side Dad relative to the trailing edge 53 of the blade body 51 cannot be sufficiently cooled with the part of the cooling air Ac flowing out from the trailing edge 53 of the blade body 51 due to the shape of the blade body 51, the relative position of the trailing edge 53 of the blade body 51 in the gas path surface 64 of the outer shroud 60o, etc., it is possible to cool this part with the cooling air Ac flowing through the plurality of back channels 75 in the pressure-side region PP.

In this embodiment, the density of openings a1 (=s1/p1 or s2/p1) of the plurality of back channels 75 in the pressure-side region PP is substantially equal to the density of openings a1 (=s1/p1) of the plurality of back channels 75 in the middle region MP. However, the density of openings of the plurality of back channels 75 in the pressure-side region PP may be set to be lower than the density of openings a1 (=s1/p1) of the plurality of back channels 75 in the middle region MP and be higher than the density of openings a2 (=s1/p2 or s2/p2) of the plurality of back channels 75 in the suction-side region NP. In other words, it is not necessary that the density of openings of the plurality of back channels 75 in the pressure-side region PP and the density of openings a1(=s1/p1) of the plurality of back channels 75 in the middle region MP are equal to each other.

This embodiment is an embodiment as a modified example of the first embodiment. However, in the second embodiment, too, the density of openings of the plurality of back channels 75 in the pressure-side region PP may be set to be substantially equal to the density of openings a1 (=s1/p1) of the plurality of back channels 75 in the middle region MP as in this embodiment.

Fourth Embodiment of Blade

A fourth embodiment of the blade according to the present invention will be described below with reference to FIG. 10.

The blade of this embodiment is also a stator blade of a gas turbine. The configuration of the stator blade of this embodiment is the same as that of the blade of the second embodiment, except that the channels inside the outer shroud 60o and the inner shroud 60i through which the cooling air Ac passes are changed from those, of the second embodiment.

Figure 10:
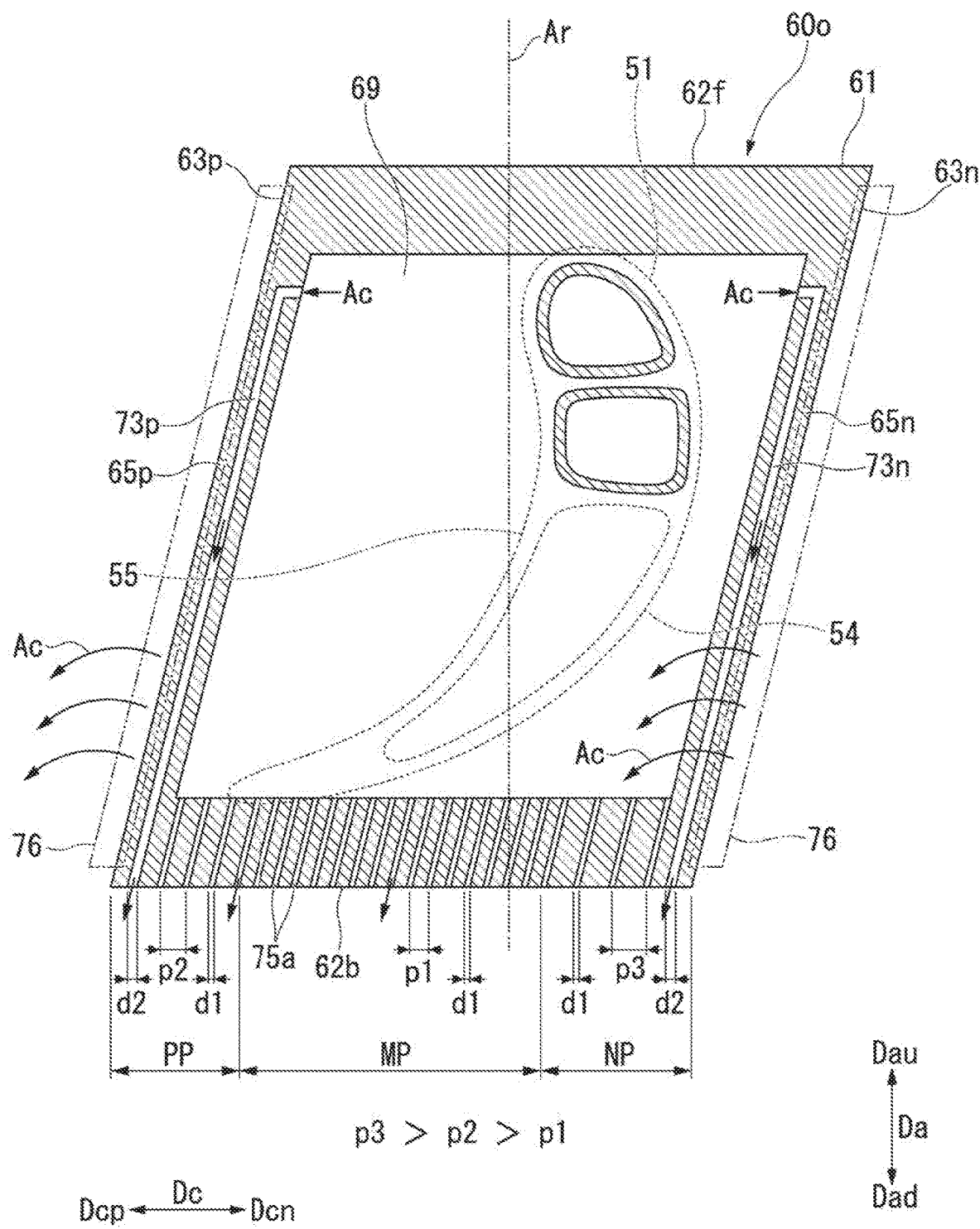
FIG. 10 is a sectional view of a stator blade in a fourth embodiment according to the present invention.

As shown in FIG. 10, in the outer shroud 60o of this embodiment, too, the pressure-side channel 73p, the suction-side channel 73n, and a plurality of back channels 75a are formed as with the blade of the second embodiment. However, the outer shroud 60o of this embodiment does, not have the back header channel 74 of the second embodiment. Accordingly, the plurality of back channels 75a each communicate with the inner cavity 69 of the outer shroud 60o, and the cooling air Ac directly flows in from the inner cavity 69.

In this embodiment, too, the inner diameters of the back channels 75a except for the pressure-side channel 73p and the suction-side channel 73n are d1 and smaller than the inner diameters d2 of the pressure-side channel 73p and the suction-side channel 73n. Accordingly, the lengths of wetted perimeter s1 of the back channels 75a except for the pressure-side channel 73p and the suction-side channel 73n are shorter than the lengths of wetted perimeter s2 of the pressure-side channel 73p and the suction-side channel 73n.

In this embodiment, all of the interval of openings p1 of the plurality of back channels 75a in the middle region MP the interval of openings p2 of the plurality of back channels 75a in the pressure-side region PP, and the interval of openings p3 of the plurality of back channels 75a in the suction-side region NP are the same as those of the second embodiment.

Accordingly, in this embodiment, all of the density of openings a1 (=s1/p1) of the plurality of back channels 75a in the middle region MP, the density of openings a2 (=s1/p2 or s2/p2) of the plurality of back channels 75a in the pressure-side region PP, and the density of openings a3 (=s1/p3 or s2/p3) of the plurality of back channels 75a in the suction-side region NP are the same as those of the second embodiment.

Therefore, this embodiment can achieve substantially the same effects as the second embodiment.

Moreover, in this embodiment, the cooling air Ac flowing into the plurality of back channels 75a flows in from the inner cavity 69, without passing through the pressure-side channel 73p or the suction-side channel 73n and the back header channel 74 as in the second embodiment. Specifically, in this embodiment, unlike in the second embodiment, the cooling air Ac having flowed into the inner cavity 69 through the air holes 68 of the impingement plate 67 impinges on the surface forming the inner cavity 69 and impingement-cools this surface, and then flows directly from the inner cavity 69 into the back channels 75a. Thus, in this embodiment, the cooling air Ac flowing into the back channels 75 is not heated up like the cooling air Ac flowing through the back header channel 74 of the first and second embodiments. Accordingly, in this embodiment, the temperature of the cooling air Ac flowing into the plurality of back channels 75a is lower than the temperature of the cooling air Ac flowing into the plurality of back channels 75 in the second embodiment. In this embodiment, therefore, the part of the gas path surface 64 of the outer shroud 60o that is located closer to the back end surface 62b can be cooled more than in the second embodiment.

Thus, the cooling air Ac flowing into the plurality of back channels 75a does not have to pass through the pressure-side channel 73p or the suction-side channel 73n and the back header channel 74 as in the second embodiment. For example, the plurality of back channels may each directly communicate with one of the plurality of blade air channels 71 (cavities) that are formed continuously inside the outer shroud 60o, the blade body 51, and the inner shroud 60i.

This embodiment is an embodiment as a modified example of the second embodiment. However, in the first and third embodiments, too, the plurality of back channels may directly communicate with the inner cavity 69 (cavity) or the blade air channels 71 (cavities) as a modified example of these embodiments.

Fifth Embodiment of Blade

A fifth embodiment of the blade according to the present invention will be described below with reference to FIG. 11 and FIG. 13.

The blade of the fifth embodiment is also a stator blade of a gas turbine. The stator blade of the fifth embodiment is a stator blade into which two stator blades of the first embodiment are integrated.

Figure 11:
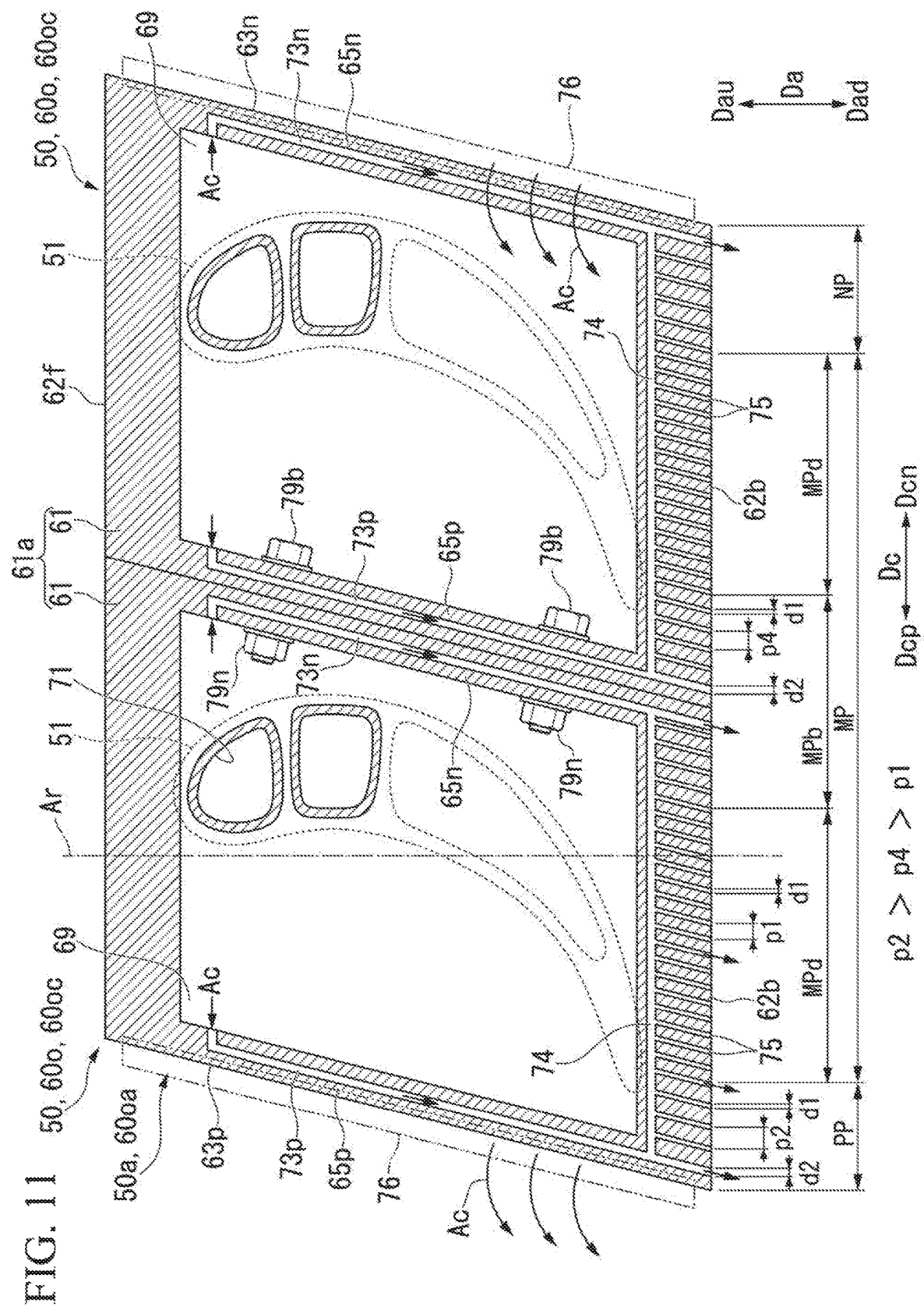
FIG. 11 is a sectional view of a stator blade in a fifth embodiment according to the present invention.

As shown in FIG. 11 a stator blade 50a of the fifth embodiment is formed by coupling together the outer shrouds 60o of two stator blades 50 of the first embodiment with bolts and nuts, and coupling together the inner shrouds 60 thereof with bolts 79b and nuts 79n. As a result, the outer shrouds 60o of the two stator blades 50 are integrated, and the inner shrouds 60 of the two stator blades 50 are integrated. A stator blade formed by thus coupling together two stator blades 50 with the bolts 79b and the nuts 79n is sometimes called a coupled stator blade, but here this stator blade is simply called a stator blade 50a.

In this embodiment, an outer shroud into which the outer shrouds 60o of the two stator blades 50 of the first embodiment are integrated will be simply called an outer shroud 60oa, and the outer shrouds 60o of the two stator blades 50 of the first embodiment will be called outer shroud segments 60oc. An inner shroud into which the inner shrouds 60i of the two stator blades 50 of the first embodiment are integrated will be simply called an inner shroud, and the inner shrouds 60i of the two suitor blades 50 of the first embodiment will be called inner shroud segments. Thus, in the stator blade 50a of this embodiment, two blade bodies 51 are provided for one outer shroud 60oa and one inner shroud. Moreover, in this embodiment, an outer shroud main body into which the outer shroud main bodies 61 of the two stator blades 50 of the first embodiment are integrated will be simply called an outer shroud main body 61a.

There is no seal plate like that of the first embodiment between the plurality of integrated outer shroud, segments 60oc or between the plurality of integrated inner shroud segments, and these shrouds are fastened together without a clearance in the circumferential direction Dc. However, as in the first embodiment, there is a clearance between the outer shroud 60oa into which the plurality of outer shroud segments 60oc are integrated and the outer shroud 60oa disposed adjacent to this outer shroud 60oa in the circumferential direction Dc, and the seal plate is disposed in this clearance. The same is true for the inner shroud segments.

The configuration of the outer shroud segment 60oc is basically the same as the configuration of the outer shroud 60o of the first embodiment. Thus, in each outer shroud segment 60oc, the pressure-side channel 73p, the suction-side channel 73n, the back header channel 74, and the plurality of back channels 75 are formed.

In this embodiment, too, the region of the back end surface 62b of the outer shroud main body 61a that does not include the edge of the suction-side end surface 63n and the edge of the pressure-side end surface 63p will be referred to as the middle region MP. The region of the back end surface 62b that includes the edge of the suction-side end surface 63n and is adjacent to the middle region MP in the circumferential direction Dc will he>referred to as the suction-side region NP. The region of the back end surface 62b that includes the edge of the pressure-side end surface 63p and is adjacent to the middle region MP in the circumferential direction Dc will be referred to as the pressure-side region PP. Moreover, in this embodiment, a region of the middle region MP that includes a region between the two blade bodies 51 will be referred to as an inter-blade region MPb, and regions of the middle region MP that are located on the downstream side Dad in the axial direction relative to the blade bodies 51 and do not include the inter-blade region MPb will he referred to as blade downstream regions MPd.

In each of the regions MPb, MPd, NP, PP, openings of three or more back channels 75 arrayed in the circumferential direction Dc are formed.

In this embodiment, too, the inner diameters of the back channels 75 except for the pressure-side channel 73p and the suction-side channel 73n are d1 and smaller than the inner diameters d2 of the pressure-side channel 73p and the suction-side channel 73n. Accordingly, the lengths of wetted perimeter s1 of the back channels 75 except for the pressure-side channel 73p and the suction-side channel 73n are shorter than the lengths of wetted perimeter s2 of the pressure-side channel 73p and the suction-side channel 73n.

In this embodiment, the interval of openings of the plurality of back channels 75 in the pressure-side region PP and the suction-side region NP is p2. The interval of openings of the plurality of back channels 75 in the blade downstream regions MPd the middle region MP is p1 (<p2). The interval of openings of the plurality of back channels 75 in the inter-blade region MPb of the middle region MP is p4. The interval of openings p4 of the plurality of back channels 75 in the inter-blade region MPb is larger than the interval of openings p1 of the plurality of back channels 75 in the blade downstream regions MPd and smaller than the interval of openings p2 of the plurality of back channels 75 in the pressure-side region PP and the suction-side region NP.

Figure 13:
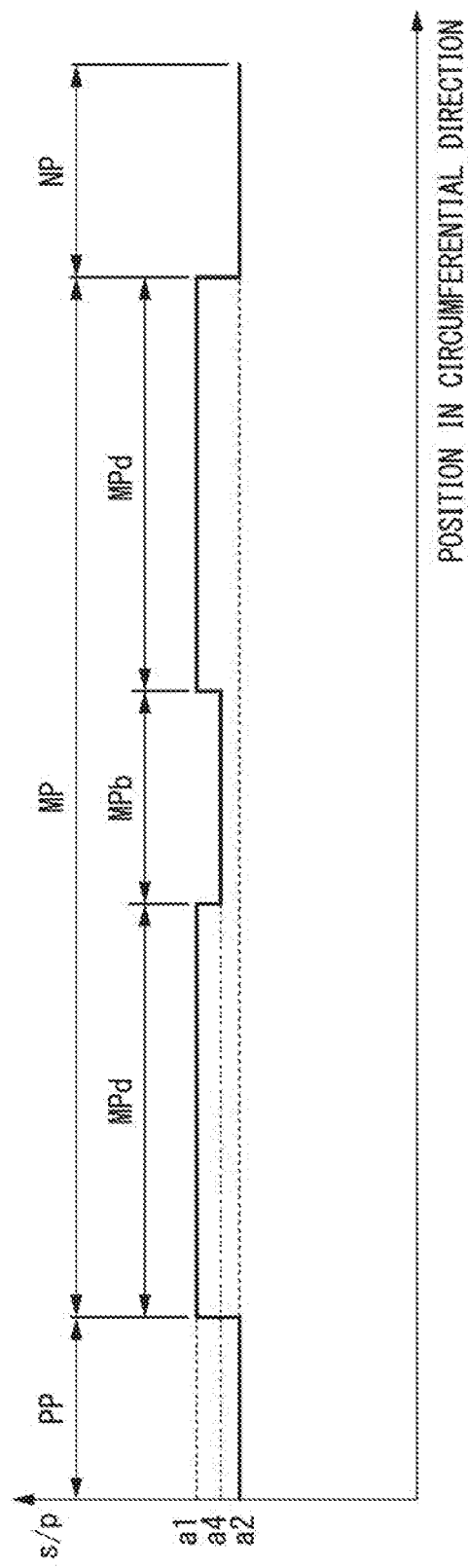
FIG. 13 is a graph showing the density of openings at each position in back end surfaces of the stator blades in the fifth embodiment and the sixth embodiment according to the present invention.

Thus, as shown in FIG. 13, the density of openings a1 (=s1/p1) of the plurality of back channels 75 in the blade downstream regions MPd of the middle region MP is higher than the density of openings a2 (=s1/p2 or s2/p2) of the plurality of back channels 75 in the pressure-side region PP and the suction-side region NP. Moreover, in this embodiment, the density of openings a4 (=s1/p4 or s2/p4) of the plurality of back channels 75 in the inter-blade region MPb of the middle region MP is lower than the density of openings a1 (=s1/p1) of the plurality of back channels 75 in the blade downstream regions MPd of the middle region MP and higher than the density of openings a2 (=s1/p2 or s2/p2) of the plurality of back channels 75 in the pressure-side region PP and the suction-side region NP.

In this embodiment, as in the first, embodiment, the part of the gas path surface 64 of the outer shroud 60oa that is located closer to the back end surface 62b and in the middle of the outer shroud 60oa except for the end-side parts in the circumferential direction Dc has a higher heat transfer coefficient for the combustion gas G due to the influence of the combustion gas G flowing along the suction-side surface 54 of the blade body 51, and is heated by the combustion gas G more than the other parts adjacent thereto in the circumferential direction Dc. This region corresponds to the blade downstream region MPd. On the other hand, the region that is the part adjacent to the blade downstream region MPd in the circumferential direction Dc and located closer to the back end surface 62b in the gas path surface 64 heated by the combustion gas G flowing along the suction-side surface 54 of the blade body 51 is cooled to some extent by the cooling air Ac flowing out from the trailing edge 53 of the blade body 51. This region corresponds to the inter-blade region MPb.

In this embodiment, therefore, the density of openings a4 (=s1/p4 or s2/p4) of the plurality of back channels 75 in the inter-blade region MPb of the middle region MP is set to be lower than the density of openings a1 (=s1/p1) of the plurality of back channels 75 in the blade downstream regions MPd of the middle region MP. As a result, in this embodiment, the total flow rate of the cooling air Ac flowing through the plurality of back channels 75 present in the part of the gas path surface 64 of the outer shroud 60oa located closer to the back end surface 62b can be reduced.

Sixth Embodiment of Blade

A sixth embodiment of the blade according to the present invention will he described below with reference to FIG. 12 and FIG. 13.

The blade of the sixth embodiment is also a stator blade of a gas turbine. As in the fifth embodiment, the stator blade of the sixth embodiment is also a stator blade into which two stator blades of the first embodiment are integrated.

Figure 12:
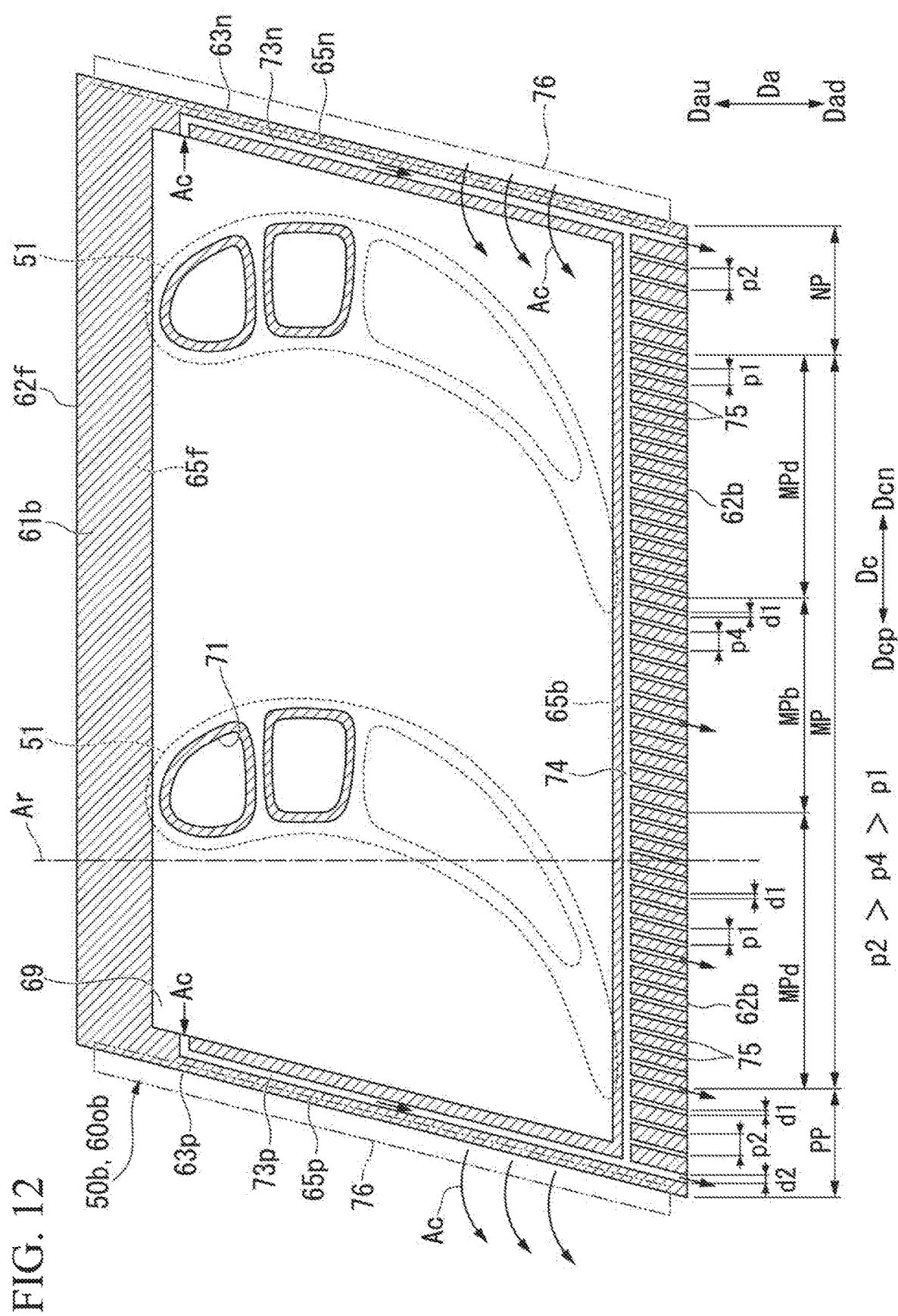
FIG. 12 is a sectional view of a stator blade in a sixth embodiment according to the present invention.

However, as shown in FIG. 12, a stator blade 50b of this embodiment is a stator blade that is formed by integrally casting two stator blades 50 of the first embodiment, instead of coupling together the outer shrouds 60o of two stator blades 50 with bolts and nuts. A stator blade formed by thus integrally casting two stator blades 50 is sometimes called a stator blade segment, but here this stator blade will be simply called a stator blade 50b. Thus, in the stator blade 50b of this embodiment, two blade bodies 51 are provided for one outer shroud 60ob and one inner shroud.

As with the outer shroud. 60o of the first embodiment, the outer shroud 60ob of this embodiment also has an outer shroud main body 61b, the front peripheral wall 65f, the back peripheral wall 65b, and the pair of side peripheral walls 65p, 65n. However, the outer shroud 60ob of this embodiment is not provided with the side peripheral walls 65p, 65n between the two blade bodies 51 of the outer shroud 60oa of the fifth embodiment.

In the outer shroud 60ob of this embodiment, too, the pressure-side channel 73p, the suction-side channel 73n, the back header channel 74, and the plurality of back channels 75 are formed as in the outer shroud 60o of the first embodiment.

In this embodiment, too, the region of the back end surface 62b of the outer shroud main body 61b that does not include the edge of the suction-side end surface 63n and the edge of the pressure-side end surface 63p will be referred to as the middle region MP. The region of the back end surface 62b that includes the edge of the suction-side end surface 63n and is adjacent to the middle region MP in the circumferential direction Dc will he referred to as the suction-side region NP. The region of the back end surface 62b that includes the edge of the pressure-side end surface 63p and is adjacent to the middle region MP in the circumferential direction Dc will be referred to as the pressure-side region PP. Moreover, in this embodiment, as in the fifth embodiment, the region of the middle region MP that includes the region between the two blade bodies 51 will be referred to as the inter-blade region MPb, and the regions of the middle region MP that are located on the downstream side Dad in the axial direction relative to the blade bodies 51 and do not include the inter-blade region MPb will be referred to as the blade downstream regions MPd. In each of the regions MPb, MPd, NP, PP, openings of three or more back channels 75 arrayed in the circumferential direction Dc are formed.

In this embodiment, too, the inner diameters of the back channels 75 except for the pressure-side channel 73p and the suction-side channel 73n are d1 and smaller than the inner diameters d2 of the pressure-side channel 73p and the suction-side channel 73n. Accordingly, the lengths of wetted perimeter s1 of the back channels 75 except for the pressure-side channel 73p and the suction-side channel 73n are shorter than the lengths of wetted perimeter s2 of the pressure-side channel 73p and the suction-side channel 73n.

In this embodiment, the intervals of openings of the plurality of back channels 75 in the regions MPb, MPd, NP, PP are the same as those of the fifth embodiment. Specifically, in this embodiment, the interval of openings of the plurality of back channels 75 in the pressure-side region PP and the suction-side region NP is p2. The interval of openings of the plurality of back channels 75 in the blade downstream regions MPd of the middle region MP is p1 (<p2). The interval of openings of the plurality of back channels 75 in the inter-blade region MPb of the middle region MP is p4. The interval of openings p4 of the plurality of back channels 75 in the inter-blade region MPb is larger than the interval of openings p1 of the plurality of back channels 75 in the blade downstream regions MPd and smaller than the interval of openings p2 of the plurality of back channels 75 in the pressure-side region PP and the suction-side region NP.

Thus, in this embodiment, too, as shown in FIG. 13, the density of openings a1 (=s1/p1) of the plurality of back channels 75 in the blade downstream regions MPd of the middle region MP is higher than the density of openings a2 (=s1/p2 or s2/p2) of the plurality of back channels 75 in the pressure-side region PP and the suction-side region NP as in the fifth embodiment. Moreover, in this embodiment, the density of openings a4 (=s1/p4 or s2/p4) of the plurality of back channels 75 in the inter-blade region MPb of the middle region MP is lower than the density of openings a1 (=s1/p1) of the plurality of back channels 75 in the blade downstream regions MPd of the middle region MP and higher than the density of openings a2 (=s1/p2 or s2/p2) of the plurality of back channels 75 in the pressure-side region PP and the suction-side region NP.

Thus, in this embodiment, too, the total flow rate of the cooling air Ac flowing through the plurality of back channels 75 present in the part of the gas path surface 64 of the outer shroud 60ob that is located closer to the back end surface 62b can be reduced as in the fifth embodiment.

In both the fifth embodiment and the sixth embodiment, the density of openings a4 (=s1/p4 or s2/p4) of the plurality of back channels 75 in the inter blade region MPb of the middle region MP is set to be lower than the density of openings a1 (=s1/p1) of the plurality of back channels 75 in the blade downstream regions MPd of the middle region MP. However, the density of openings of the plurality of back channels 75 in the inter-blade region MPb of the middle region MP and the density of openings of the plurality of back channels 75 in the blade downstream regions MPd of the middle region MP may be set to be equal to each other. In other words, the density of openings of the plurality of back channels 75 in the middle region MP may be set to be constant.

Both the stator blades of the fifth embodiment and the sixth embodiment are a stator blade into which two stator blades 50 of the first embodiment are integrated. Alternatively, three or more stator blades 50 may be integrated.

Both the stator blades of the fifth embodiment and the sixth embodiment are a stator blade into which the stator blades 50 of the first embodiment are integrated. Alternatively, the stator blades of the second embodiment may be integrated, or the stator blades of the third embodiment may be integrated.

Figure 14:
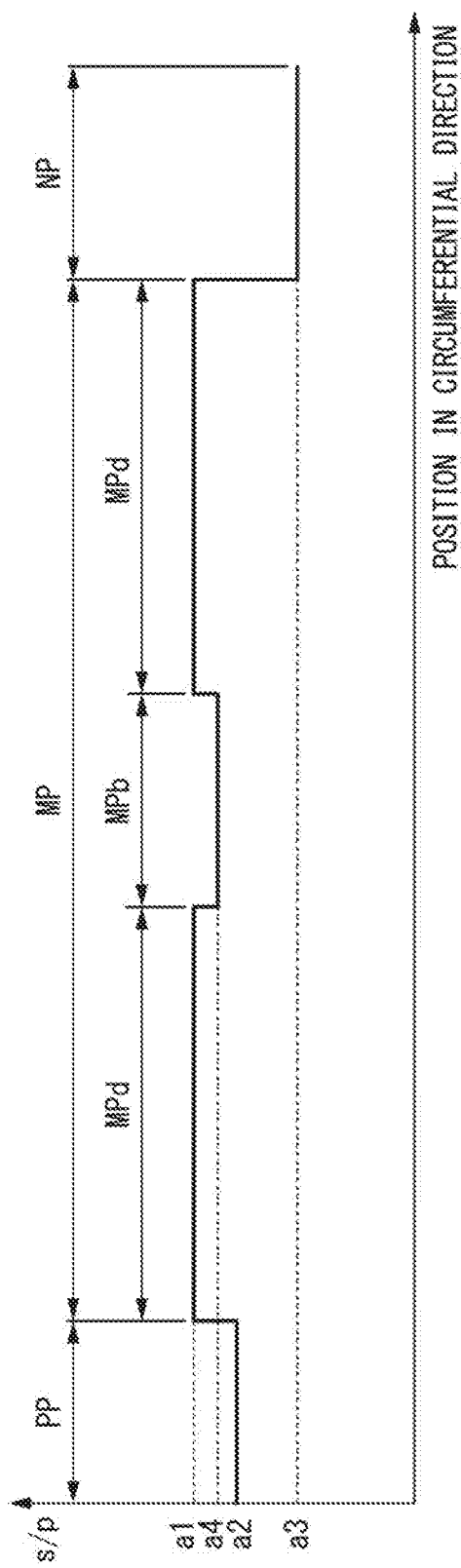
FIG. 14 is a graph showing the density of openings at each position in a back end surface of a stator blade in a first modified example of the fifth embodiment and the sixth embodiment according to the present invention.

In the case where the stator blades of the second embodiment are integrated, as shown in FIG. 14, the density of openings a3 (=s1/p3 or s2/p3) of the plurality of back channels 75 in the suction-side region NP is lower than the density of openings a2 (=(s1/p2 or s2/p2) of the plurality of back channels 75 in the pressure-side region PP.

Figure 15:
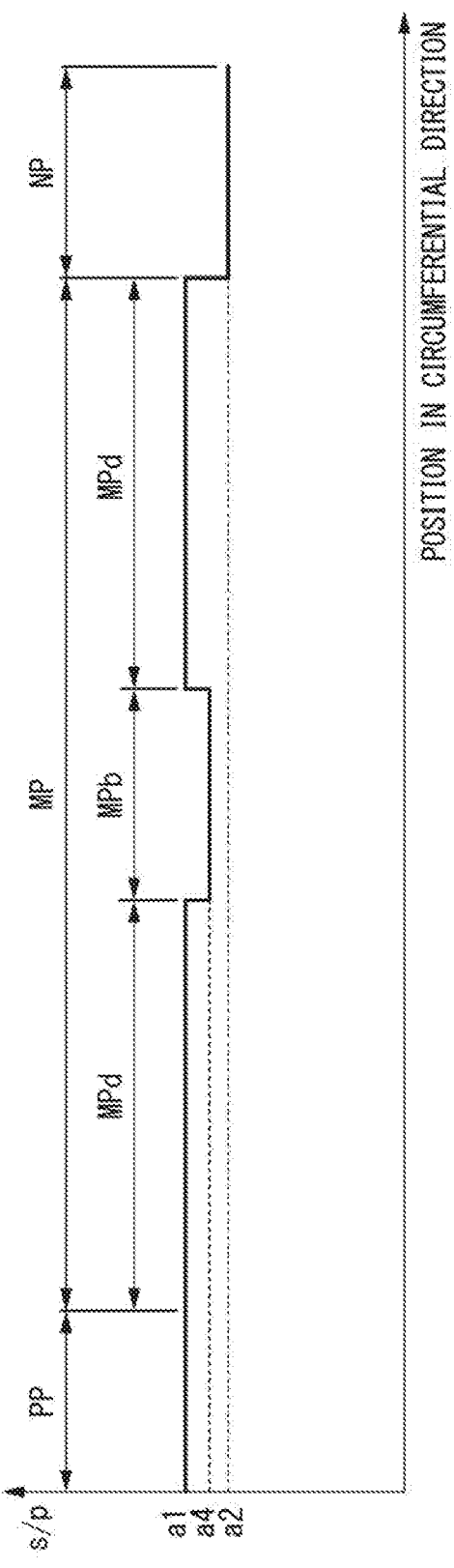
FIG. 15 is a graph showing the density of openings at each position in a back end surface of a stator blade in a second modified example of the fifth embodiment and the sixth embodiment according to the present invention.

In the case where the stator blades of the third embodiment are integrated, as shown in FIG. 15, the density of openings a1 (=s1/p1 or s2/p1) of the plurality of back channels 75 in the pressure-side region PP is substantially equal to the density of openings a1 (=s1/p1) of the plurality of back channels 75 in the blade downstream regions MPd of the middle region MP.

In the fifth embodiment and the sixth embodiment, too, the plurality of back channels 75 may directly communicate with the inner cavity 69 or the blade air channels 71 as in the fourth embodiment, As described above, the inner shroud 60i of each of the above embodiments has the same basic structure as the outer shroud 60o. Thus, the inner shroud 60i has a plate-like inner shroud main body spreading in the axial direction Da and the circumferential direction Dc, and a peripheral wall extending along outer peripheral edges of the inner shroud main body and protruding from the inner, shroud main body toward the radially inner side Dri.

Seventh Embodiment of Blade

A seventh embodiment of the blade according to the present invention will be described below with reference to FIG. 16 and FIG. 17.

The blade of this embodiment is also a stator blade of a gas turbine. The configuration of the stator blade of this embodiment is the same as that of the blade of the first embodiment, except that channels through which the cooling air Ac passes are added to the outer shroud 60o and the inner shroud 60i of the first embodiment.

Figure 16:
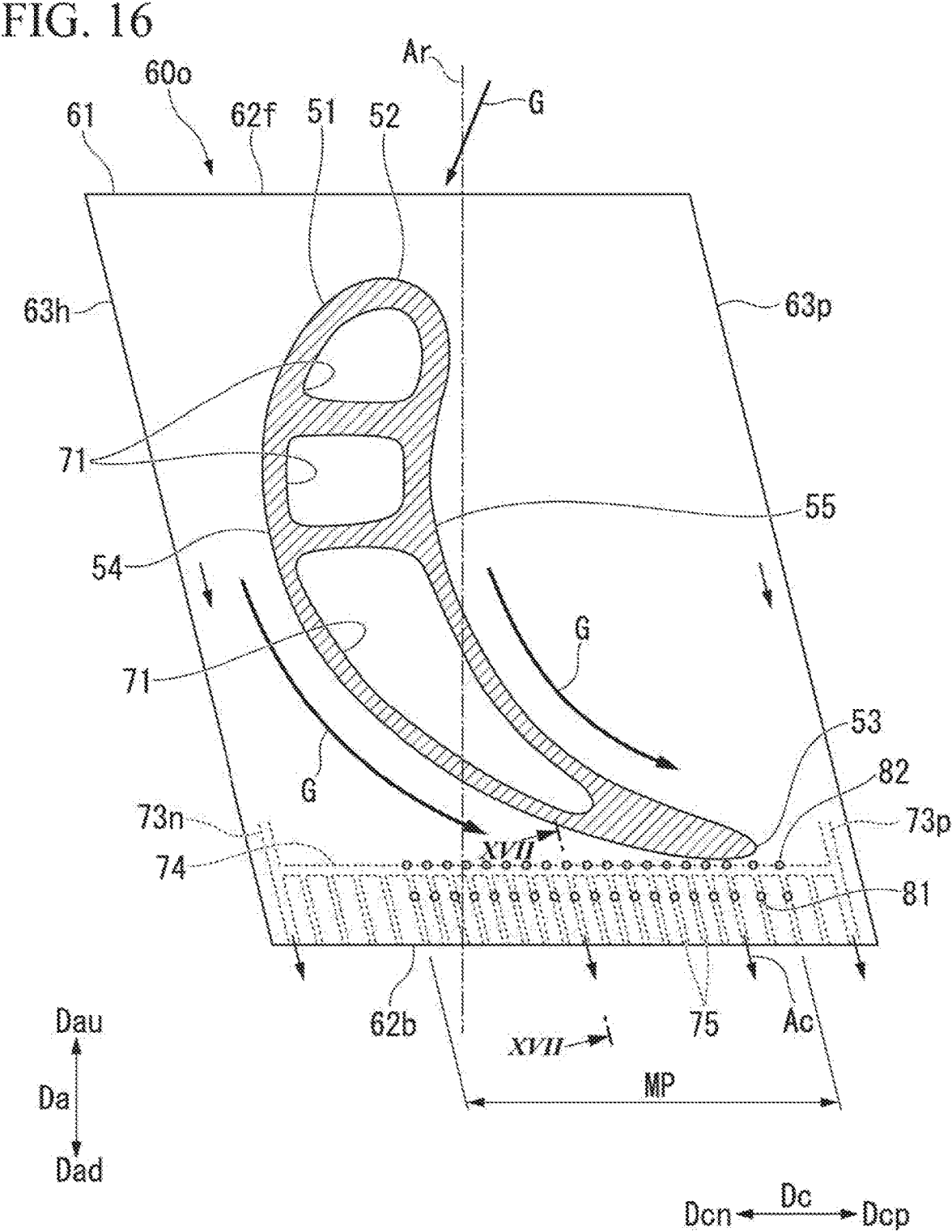
FIG. 16 is a plan view of an outer shroud of a stator blade in a seventh embodiment according to the present invention.

As shown in FIG. 16, in the outer shroud 60o of this embodiment, too, the pressure-side channel 73p, the suction-side channel 73n, the back header channel 74, and the plurality of back channels 75 are formed as with the blade of the first embodiment. In the outer shroud 60o of this embodiment, first gas path surface blowout channels 81 and second gas path surface blowout channels 82 are further formed. FIG. 16 is a plan view of the outer shroud 60o as seen from the radially inner side Dri.

Figure 17:
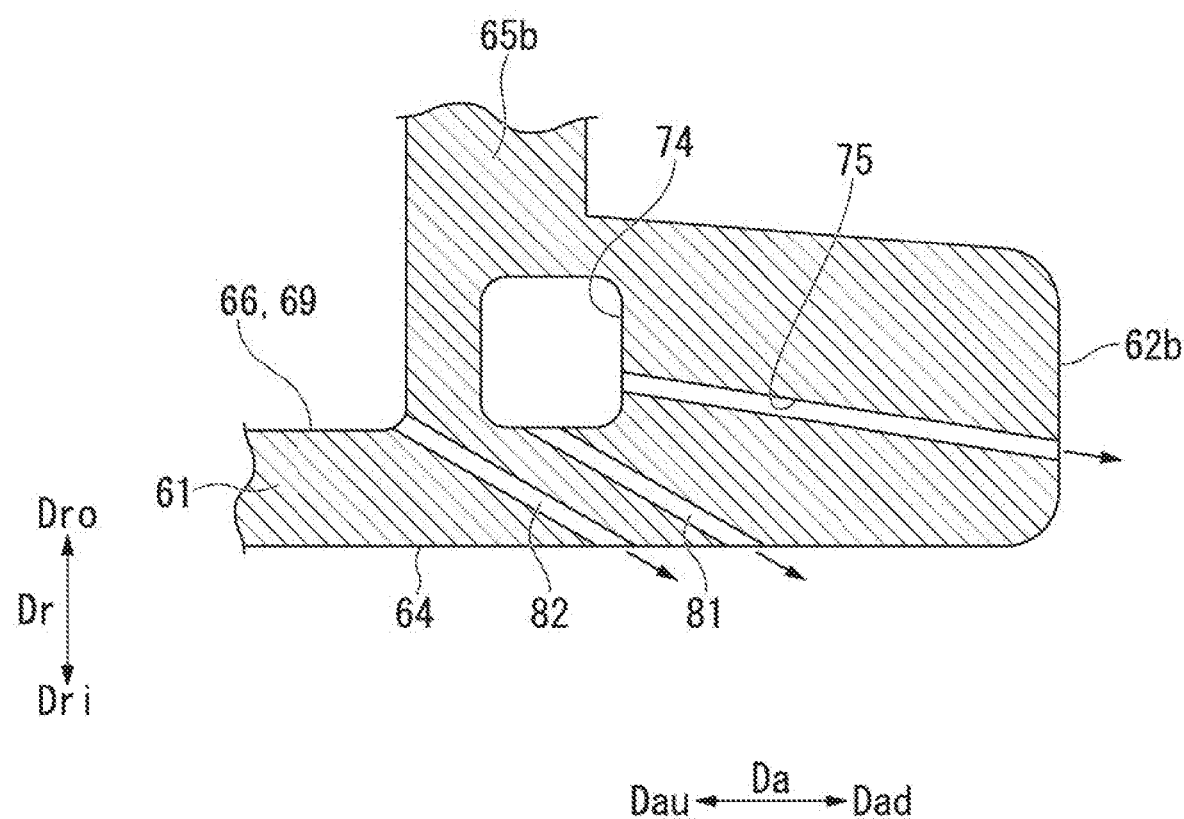
FIG. 17 is a sectional view taken along the line XVII-XVII of FIG. 16.

As shown in FIG. 17, the plurality of first gas path surface blowout channels 81 extend in the axial direction Da. Ends of the plurality of first gas path surface blowout channels 81 on the upstream side Dau connect to the back header channel 74. Ends of the plurality of first gas path surface blowout channels 81 on the downstream side Dad are open in the gas path surface 64. Openings of the plurality of first gas path surface blowout channels 81 in the gas path surface 64 are arrayed in a region on the downstream side Dad relative to the trailing edge 53 of the blade body 51, along the back end surface 62b of the outer shroud 60o. Accordingly, the openings of the plurality of first gas path surface blowout channels 81 in the gas path surface 64 are arrayed in the circumferential direction Dc.

The plurality of second gas path surface blowout channels 82 extend in the axial direction Da. Ends of the plurality of second gas path surface blowout channels 82 on the upstream side Dau are open in the vicinity of a corner between an inner surface that is a surface of the back peripheral wall 65b and faces the recess 66 and a bottom surface of the recess 66. Ends of the plurality of second gas path surface blowout channels 82 on the downstream side Dad are open in the gas path surface 64. Openings of the plurality of second gas path surface blowout channels 82 in the gas path surface 64 are arrayed in a region on the downstream side Dad relative to the trailing edge 53 of the blade body 51, along the back end surface 62b of the outer shroud 60o. Accordingly, the openings of the plurality of second gas path surface blowout channels 82 in the gas path surface 64 are also arrayed in the circumferential direction Dc.

Both the openings of the plurality of first gas path surface blowout channels 81 in the gas path surface 64 and the openings of the plurality of second gas path surface blowout channels 82 in the gas path surface 64 are formed in the middle region MP of the gas path surface 64 in the circumferential direction Dc. Moreover, both the plurality of first gas path surface blowout channels 81 and the plurality of second gas path surface blowout channels 82 are inclined relative to the gas path surface 64 so as to be gradually directed toward the downstream side Dad as these channels approach the gas path surface 64. The significance of the middle region MP will be described later.

Part of the cooling air Ac flowing through the back header channel 74 flows into the plurality of first gas path surface blowout channels 81. The cooling air having flowed into the plurality of first gas path surface blowout channels 81 flows out into the combustion gas flow passage 49. This cooling air Ac flows along the gas path surface 64 and film-cools the gas path surface 64. Part of the cooling air Ac inside the inner cavity 69 flows into the plurality of second gas path surface blowout channels 82. The cooling air Ac having flowed into the plurality of second gas path surface blowout channels 82 flows out into the combustion gas flow passage 49. This cooling air Ac flows along the gas path surface 64 and film-cools the gas path surface 64.

The cooling air Ac from the pressure-side channel 73p flows into the back header channel 74 from an end of the back header channel 74 on the circumferential pressure side Dcp. This cooling air Ac flows sequentially into the plurality of back channels 75 in the process of flowing through the back header channel 74 toward the circumferential suction side Dcn. The cooling air Ac from the suction-side channel 73n flows into the back header channel 74 from an end of the back header channel 74 on the circumferential suction side Dcn. This cooling air Ac sequentially flows into the plurality of back channels 75 in the process of flowing through the back header channel 74 toward the circumferential pressure side Dcp. Accordingly, the flow rate of the cooling air Ac flowing in the middle region MP of the back header channel 74 in the circumferential direction Dc is lower than the flow rate of the cooling air Ac flowing on both end sides of the back header channel 74 in the circumferential direction Dc. Thus, when the flow rate of the cooling air Ac flowing in the middle region MP of the back header channel 74 in the circumferential direction Dc becomes low, the flow velocity of the cooling air flowing in the middle region MP of the back header channel 74 in the circumferential direction Dc becomes lower than the flow velocity of the cooling air Ac flowing on both end sides of the back header channel 74 in the circumferential direction Dc. Accordingly, the heat transfer coefficient between the cooling air Ac flowing through the back header channel 74 and the outer shroud 60o becomes lower in the middle region MP of the back header channel 74 in the circumferential direction Dc than on both end sides of the back header channel 74 in the circumferential direction Dc. Moreover, the cooling air Ac flowing through the back header channel 74 is gradually heated in the process of flowing to the middle region MP in the circumferential direction Dc from both end sides in the circumferential direction Dc. Accordingly, the effect of convective cooling by the cooling air Ac flowing through the back header channel 74 is smaller in the middle region MP in the circumferential direction Dc than on both end sides in the circumferential direction Dc.

Moreover, as described above, the part of the gas path surface 64 that is located closer to the back end surface 62b and in the middle region MP in the circumferential direction Dc has a higher heat transfer coefficient between the combustion gas G and the gas path surface 64, and is heated by the combustion gas G more easily than the other parts.

In other words, in the part of the gas path surface 64 that is located closer to the back end surface 62b and in the middle region MP in the circumferential direction Dc, the effect of convective cooling by the cooling air Ac flowing through the back header channel 74 is small, and this part is easily heated by the combustion gas G.

In this embodiment, therefore, to enhance the cooling performance in the part of the gas path surface 64 that is located closer to the back end surface 62b and in the middle region MP in the circumferential direction Dc, the plurality of first gas path surface blowout channels 81 and the plurality of second gas path surface blowout channels 82 opening in the part of the gas path surface 64 that is located closer to the back end surface 62b and in the middle region MP in the circumferential direction Dc are provided.

In this embodiment, the plurality of first gas path surface blowout channels 81 and the plurality of second gas path surface blowout channels 82 are provided, but only either of the gas path surface blowout channels may be provided.

In this embodiment, the openings of the plurality of first gas path surface blowout channels 81 in the gas path surface 64 are arrayed in one row in the circumferential direction Dc. However, these openings may be arrayed in a plurality of rows in the circumferential direction Dc. In this embodiment, the openings of the plurality of second gas path surface blowout channels 82 in the gas path surface 64 are also arrayed in one row in the circumferential direction Dc. However, these openings may also be arrayed in a plurality of rows in the circumferential direction Dc.

This embodiment is a modified example of the outer shroud 60o of the first embodiment. However, the flow passage forming plates of the preceding embodiments and the following embodiment may also be provided with the plurality of first gas path surface blowout channels 81 and/or the plurality of second gas path surface blowout channels 82 as in this embodiment.

Eighth Embodiment of Blade

Figure 18:
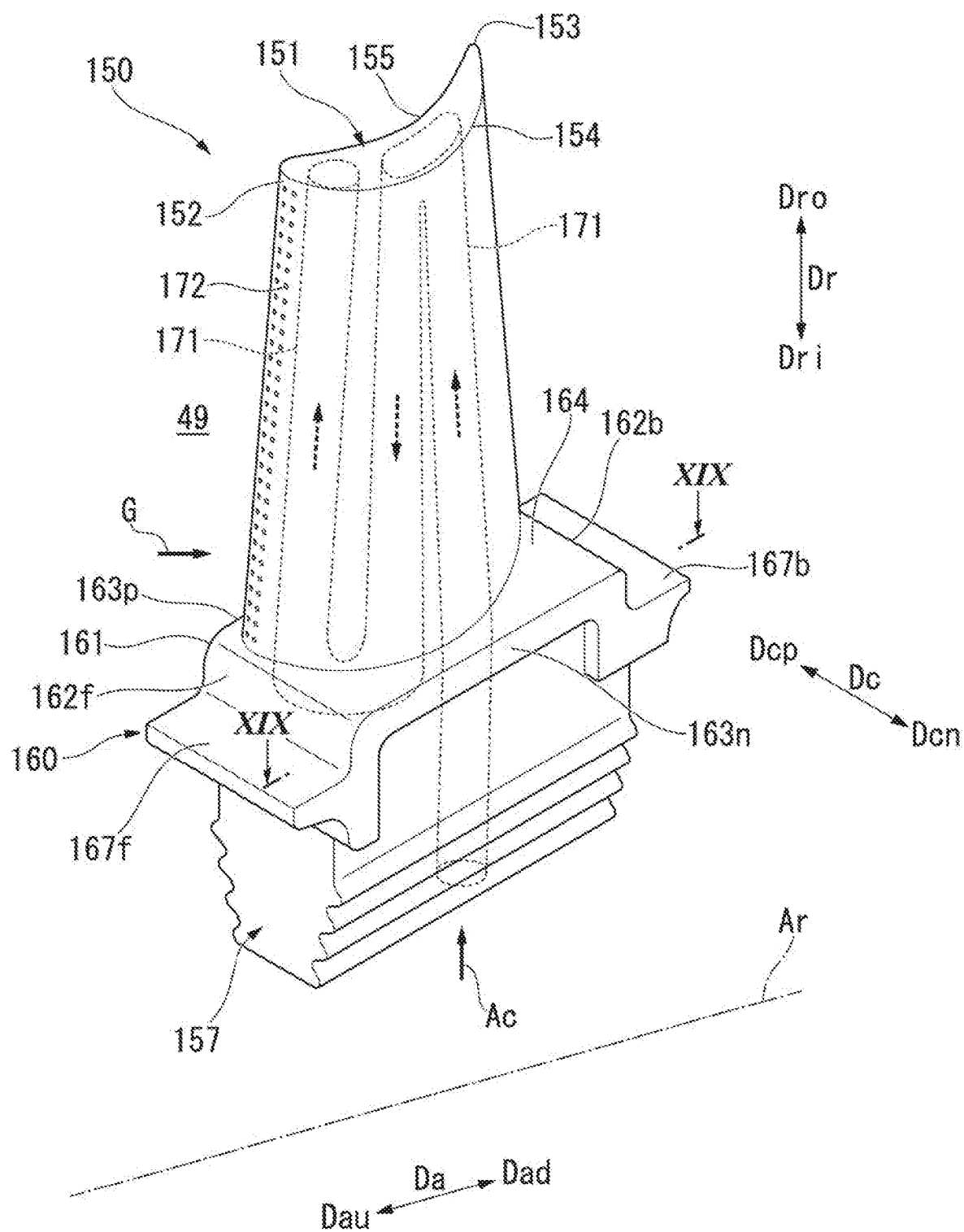
FIG. 18 is a perspective view of a rotor blade in an eighth embodiment according to the present invention.

An eighth embodiment of the blade according to the present invention will be described below with reference to FIG. 18 and FIG. 19.

Unlike the above embodiments, the blade of the eighth embodiment is a rotor blade of a gas turbine. As shown in FIG. 18, a rotor blade 150 of this embodiment has a blade body 151 extending in the radial direction Dr, a platform 160 formed on the radially inner side Dri of the blade body 151, and a blade root 157 formed on the radially inner side Dri of the platform 160. The blade body 151 is disposed in the combustion gas flow passage 49 (see FIG. 2). The platform 160 defines the position of the annular combustion gas flow passage 49 on the radially inner side Dri. Thus, the platform 160 is a flow passage forming plate that defines a part of the combustion gas flow passage 49.

An end of the blade body 151 on the upstream side Dau forms a leading edge 152, and an end thereof on the downstream side Dad forms a trailing edge 153. Of surfaces of the blade body 151 facing the circumferential direction Dc, a convex surface forms a suction-side surface 154 (negative pressure surface), and a concave surface forms a pressure-side surface 155 (positive pressure surface). For the convenience of the following description, a pressure side (positive pressure-surface side) of the blade body 151 and a suction side (negative pressure-surface side) of the blade body 151 in the circumferential direction Dc will be referred to as a circumferential pressure side Dcp and a circumferential suction side Dcn, respectively. The circumferential suction side Dcn of the rotor blade 150 is a front side in a rotation direction of the rotor shaft 42. Conversely the circumferential suction side Dcn of the stator blade 50 described earlier is a back side in the rotation direction of the rotor shaft 42. Thus, the circumferential suction side Dcn of the rotor blade 150 is the opposite side from the circumferential suction side Dcn of the stator blade 50 in the circumferential direction Dc. The upstream side Dau in the axial direction Da and the downstream side Dad in the axial direction Da may be referred to as a front side and a back side, respectively.

A cross-section of the blade root 157 perpendicular to a blade chord of the blade body 151 has a Christmas tree shape with a wide portion and a narrow portion succeeding each other toward the radially inner side Dri. In the rotor shaft 42, a blade root groove into which the blade root 157 is fitted is formed.

The platform 160 has a plate-like platform main body 161 spreading in the axial direction Da and the circumferential direction Dc, a back protrusion 167b protruding from the downstream side Dad of the platform main body 161 toward the downstream side Dad, and a front protrusion 167f protruding from the upstream side. Dau of the platform main body 161 toward the upstream side Dau.

The platform main body 161 has a front end surface 162f being an end surface on the upstream side Dau, a back end surface 162b being an end surface on the downstream side Dad, a pressure-side end surface 163p being an end surface on the circumferential pressure side Dcp, a suction-side end surface 163n being an end surface on the circumferential suction side Dcn, and a gas path surface 164 facing the radially outer side Dro. The front end surface 162f and the back end surface 162b are nearly parallel to each other. The pressure-side end surface 163p and the suction-side end surface 163n are nearly parallel to each other. Thus, when seen from the radial direction Dr, the platform main body 161 has a parallelogram shape as shown in FIG. 19. Of the platforms 160 of two rotor blades 150 adjacent to each other in the circumferential direction Dc, the pressure-side end surface 163p of the platform 160 of one rotor blade 150 and the suction-side end surface 163n of the platform 160 of the other rotor blade 150 face each other. The front end surface 162f of the rotor blade 150 faces the back end surface of the inner shroud of the stator blade adjacent to this rotor blade 150 from the upstream side Dau. The back end surface 162b of the rotor blade 150 faces the front end surface of the inner shroud of the stator blade adjacent to this rotor blade 150 from the downstream side Dad.

The back protrusion 167b protrudes toward the downstream side Dad from a position shifted from the back end surface 162b of the platform main body 161 toward the radially inner side Dri. The back protrusion 167b is formed along the back end surface 162b of the platform main body 161. The front protrusion 167f protrudes toward the upstream side Dau from a position shifted from the front end surface 162f of the platform main body 161 toward the radially inner side Dri. The front protrusion 167f is formed along, the front end surface 162f of the platform main body 161.

In the rotor blade 150, a plurality of blade air channels 171 (cavities) extending in the radial direction Dr are formed. Each blade air channel 171 is formed continuously from at least the blade body 151, among the blade body 151, the platform 160, and the blade root 157, to the platform 160. The plurality of blade air channels 171 are arrayed along the blade chord of the blade body 151. Some of the adjacent blade air channels 171 communicate with each other at a part on the radially outer side Dro inside the blade body 151 or at a part on the radially inner side Dri of the platform 160. One of the plurality of blade air channels 171 is formed continuously through the blade body 151, the platform 160, and the blade root 157, and opens at an end of the blade root 157 on the radially inner side Dri. The cooling air Ac flows through the cooling air channels 42p (see FIG. 2) of the rotor shaft 42 and flows from this opening into the blade air channel 171.

In the leading edge 152 and the trailing edge 153 of the blade body 151, a plurality of blade surface blowout channels 172 extending through these edges from the blade air channels 171 to the combustion gas flow passage 49 are formed. The blade body 151 is cooled in the process of the cooling air Ac flowing through the blade air channels 171. The cooling air Ac having flowed into the blade air channels 171 flows out from the blade surface blowout channels 172 into the combustion gas flow passage 49. Thus, the leading edge 152 and the trailing edge 153 of the blade body 151 are cooled in the process of the cooling air Ac flowing through the blade surface blowout channels 172. Moreover, part of the cooling air Ac having flowed out from the blade surface blowout channels 172 into the combustion gas flow passage 49 serves also as film air by partially covering a surface of the blade body 151.

Figure 19:
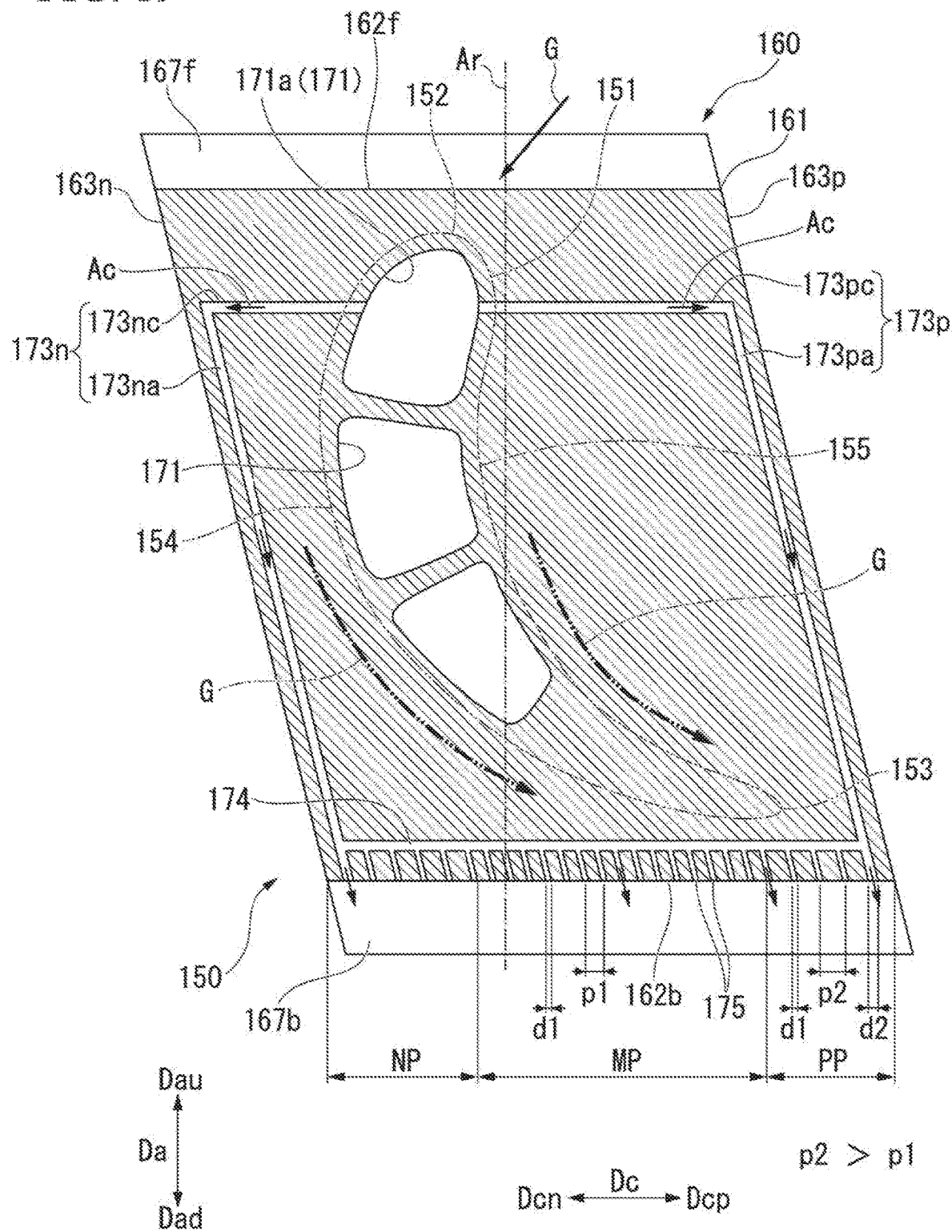
FIG. 19 is a sectional view taken along the line XIX-XIX of FIG. 18.

As shown in FIG. 19, in the platform main body 161, a pressure-side channel 173p and a suction-side channel 173n communicating with a first blade air channel 171a of the plurality of blade air channels 171 that is located farthest on the upstream side Dau are formed. The pressure-side channel 173p has a circumferential channel portion 173pc extending from the first blade air channel 171a toward the circumferential pressure side Dcp to reach the vicinity of the pressure-side end surface 163p, and an axial channel portion 173pa extending from an end of the circumferential channel portion 173pc on the circumferential pressure side Dcp along the pressure-side end surface 163p in a direction having a component of the axial direction Da. The suction-side channel 173n has a circumferential channel portion 173nc extending from the first blade air channel 171a toward the circumferential suction side Dcn to reach the vicinity of the suction-side end surface 163n, and an axial channel portion 173na extending from an end of the circumferential channel portion 173nc on the circumferential suction side Den along the suction-side end surface 163n in a direction having a component of the axial direction Da. Both the pressure-side channel 173p and the suction-side channel I 73n are open in the back end surface 162b of the platform main, body 161 at their downstream ends. In the platform main body 161, a back header channel 174 extending along the back end surface. 162b in the circumferential direction Dc is formed. Moreover, in the platform main body 161, a plurality of back channels 175 extending from the back header channel 174 toward the downstream side Dad and opening in the back end surface 162b are formed. The plurality of back channels 175 are arrayed in the circumferential direction Dc. Portions of the pressure-side channel 173p and the suction-side channel 173n located on the downstream side Dad from the positions at which these channels communicate with the back header channel 174 constitute back channels 175 that open in the back end surface 162b.

All the back channels 175 including the pressure-side channel 173p and the suction-side channel 173n have a circular cross-sectional shape. The inner diameters d1 of the back channels 175 except for the pressure-side channel 173p and the suction-side channel 173n are equal to one another and smaller than the inner diameters d2 of the pressure-side channel 173p and the suction-side channel 173n. Accordingly, the lengths of wetted perimeters s1 of the back channels 175 except for the pressure-side channel 173p and the suction-side channel 173n are equal to one another and shorter than the lengths of wetted perimeter s2 of the pressure-side channel 173p and the suction side channel 173n.

Here, a region of the back end surface 162b of the platform main body 161 that does not include an edge of the suction-side end surface 163n and an edge of the pressure-side end surface 163p will be referred to as a middle region MP. A region of the back end surface 162b that includes the edge of the suction-side end surface 163n and is adjacent to the middle region MP in the circumferential direction Dc will be referred to as a suction-side region NP. A region of the back end surface 162b that includes the edge of the pressure-side end surface 163p and is adjacent to the middle region MP in the circumferential direction Dc will be referred to as a pressure-side region PP. In each of the regions MP, NP, PP, openings of three or more back channels 175 arrayed in the circumferential direction Dc are formed.

The interval of openings of the plurality of back channels 175 in the middle region MP is p1. Both the interval of openings of the plurality of back channels 175 in the suction-side region NP and the interval of openings of the plurality of back channels 175 in the pressure-side region PP are p2. The interval of openings p1 of the plurality of back channels 175 in the middle region MP is smaller than the interval of openings p2 of the plurality of back channels 175 in the suction-side region NP and the pressure-side region PP.

Accordingly, as shown in FIG. 5, the density of openings a1 (=s1/p1) of the plurality of back channels 175 in the middle region MP is higher than the density of openings a2 (=s1/p2 or s2/p2) of the plurality of back channels 175 in the pressure-side region PP and the suction-side region NP.

In the rotor blade 150, too, as in the stator blade described earlier, a part of the gas path surface 164 of the platform main body 161 that is located closer to the back end surface 162b and in the middle in the circumferential direction Dc is heated by the combustion gas G more easily than the other parts. Moreover, the cooling performance of the cooling air Ac flowing through one back channel 175 present in this middle part is lower than the cooling performance of the cooling air Ac flowing through one back channel 175 present in another part. Conversely, parts of the gas path surface 164 of the platform 160 that are located closer to the back end surface 162b and on the end sides in the circumferential direction Dc are heated by the combustion gas G to a less extent than the middle part in the circumferential direction Dc. Moreover, the cooling performance of the cooling air Ac flowing through one back channel 175 present in one of the parts of the gas path surface 164 of the platform 160 that are located closer to the back end surface 162b and on the side ends in the circumferential direction Dc is higher than the cooling performance of the cooling air Ac flowing through one back channel 175 present in the middle part in the circumferential direction Dc.

In this embodiment, therefore, the density of openings a1 (=s1/p1) of the plurality of back channels 175 in the middle region MP is set to be higher than the density of openings a2 (=s1/p2 or s2/p2) of the plurality of back channels 175 in the pressure-side region PP and the suction-side region NP as in the stator blade of the first embodiment. As a result, in this embodiment, the cooling performance in the part of the gas path surface 164 of the platform 160 that is located closer to the back end surface 162b and in the middle m the circumferential direction Dc can be enhanced, and thus the durability of the blade can he improved. Moreover, in this embodiment, the total flow rate of the cooling air Ac flowing through the plurality of back channels 175 present in the parts of the gas path surface 164 of the platform 160 that are located closer to the back end surface 162b and on the end sides in the circumferential direction Dc can be reduced.

Thus, in this embodiment, it is possible to improve the durability of the platform 160 by effectively cooling the part of the gas path surface 164 of the platform 160 that is-located closer to the back end surface 162b, and at the same time to reduce the flow rate of the cooling air Ac for cooling this part.

In this embodiment, the pressure-side channel 173p and the suction-side channel 173n communicate with the first blade air channel 171a of the plurality of blade air channels 171 that is located farthest on the upstream side Dau. However the pressure-side channel 173p and the suction-side channel 173n may communicate with another blade air channel 171. Moreover, it is not necessary that the pressure-side channel 173p and the suction-side channel 173n communicate with the same blade air channel 171, and these channels may instead communicate with different blade air channels 171.

In this embodiment, the cooling air Ac flowing into the plurality of back channels 175 does not have to pass through the pressure-side channel 173p or the suction-side channel 173n and the back header channel 174 from the blade air channel 171. For example, the plurality of back channels 175 may each communicate with one of the plurality of blade air channels 171.

In this embodiment, the configuration of the channels through which air flows in the stator blade of the first embodiment is applied to a rotor blade. However, the configurations of the channels through which air flows in the stator blades of the second embodiment and the third embodiment may be applied to a rotor blade.

MODIFIED EXAMPLES

In the above embodiments, all the back channels including the pressure-side channel and the suction-side channel have a circular cross-sectional shape. However, the back channels including the pressure-side channel and the suction-side channel may have another cross-sectional shape, for example, a quadrangular shape. Moreover, it is not necessary that the plurality of back channels have the same cross-sectional shape. For example, the pressure-side channel and the suction-side channel may have a quadrangular cross-sectional shape, while the back channels except for the pressure-side channel and the suction-side channel may have a circular cross-sectional shape.

In the above embodiments, the inner diameters of the plurality of back channels except for the pressure-side channel and the suction-side channel are equal to one another, but the inner diameters of these back channels may be different from one another.

INDUSTRIAL APPLICABILITY

According to one aspect of the present invention, it is possible to improve the durability of a blade by effectively cooling the blade, and at the same time to reduce the amount of cooling air used.

REFERENCE SIGNS LIST

10 Gas turbine
11 Gas turbine rotor
15 Gas turbine casing
20 Compressor
21 Compressor rotor
25 Compressor casing
30 Combustor
40 Turbine
41 Turbine rotor
42 Rotor shaft
42p, 45p Cooling air channel
43 Rotor blade stage
43a Rotor blade
45 Turbine casing
46 Stator blade stage
46a Stator blade
50, 50a, 50b Stator blade
51 Blade body
52 Leading edge
53 Trailing edge
54 Suction-side surface
55 Pressure-side surface
60o Outer shroud (flow passage forming plate)
60i Inner shroud (flow passage forming plate)
61, 61a, 61b Outer shroud main body
62f Front end surface
62b Back end surface
63p Pressure-side end surface
63n Suction-side end surface
64 Gas path surface
65 Peripheral wall
66 Recess
67 Impingement plate
69 Inner cavity (cavity)
71 Blade air channel (cavity)
72 Blade surface blowout channel
73p Pressure-side channel
73n Suction-side channel
74 Back header channel
75, 75a Back channel
76 Seal plate
77 Seal groove
78 Clearance
81 First gas path surface blowout channel
82 Second gas path surface blowout channel
150 Rotor blade
151 Blade body
152 Leading edge
153 Trailing edge
154 Suction-side surface
155 Pressure-side surface
157 Blade root
160 Platform (flow passage forming plate)
161 Platform main body
162f Front end surface
162b Back end surface
163p Pressure-side end surface
163n Suction-side end surface
164 Gas path surface
167f Front protrusion
167b Back protrusion
171 Blade air channel (cavity)
172 Blade surface blowout channel
173p Pressure-side channel
173n Suction-side channel
174 Back header channel
175 Back channel
Da Axial direction
Dan Upstream side
Dad Downstream side
De Circumferential direction
Dcp Circumferential pressure side
Dcn Circumferential suction side
Dr Radial direction
Dri Radially inner side
Dro Radially outer side
Ac Cooling air
G Combustion gas
MP Middle region
MPb Inter-blade region
MPd Blade downstream region
PP Pressure-side region
NP Suction-side region

The invention claimed is:

1. A blade of a gas turbine, the gas turbine having a combustion flow passage inside the gas turbine, the combustion flow passage having an annular shape around a rotor shaft, the rotor shaft extending in an axial direction, the annular combustion flow passage extending in the axial direction, the blade comprising:
a blade body that is disposed in the combustion gas flow passage through which combustion gas flows, and extends in a radial direction of the rotor shaft; and
a flow passage forming plate that is formed at an end of the blade body in the radial direction of the rotor shaft and defines a part of the combustion gas flow passage, wherein
the flow passage forming plate has:
a back end surface that is an end surface on a downstream side of the forming plate in the axial direction of the rotor shaft in which the combustion gas flows;
a pressure-side end surface that is an end surface on a circumferential pressure side that is a pressure side of the blade body in a circumferential direction around the rotor shaft as a central axis;
a suction-side end surface that is an end surface on a circumferential suction side that is the opposite side from the circumferential pressure side;
a cavity into which cooling air flows;
a plurality of back channels that open in the back end surface; and
a back header channel extending in the circumferential direction along a continuous and uninterrupted wall separating the cavity and the back header channel, the back header channel communicating with the cavity and the plurality of back channels,
openings of a plurality of the back channels arrayed in the circumferential direction are formed in each of a middle region of the back end surface that does not include an edge of the suction-side end surface and an edge of the pressure-side end surface, a suction-side region of the back end surface that includes the edge of the suction-side end surface and is adjacent to the middle region in the circumferential direction, and a pressure-side region of the back end surface that includes the edge of the pressure-side end surface and is adjacent to the middle region in the circumferential direction, and
a density of openings of the plurality of back channels in the middle region is higher than the density of openings of the plurality of back channels in at least one side region of the suction-side region and the pressure-side region, the density of openings being a ratio of a length of wetted perimeter of the plurality of back channels to an interval of openings of the plurality of back channels.

2. The blade of a gas turbine according to claim 1, wherein the density of openings in the middle region is higher than the density of openings in the suction-side region.

3. The blade of a gas turbine according to claim 1, wherein the density of openings in the middle region is higher than the density of openings in the suction-side region and the density of openings in the pressure-side region.

4. The blade of a gas turbine according to claim 1, wherein the density of openings in the pressure-side region is higher than the density of openings in the suction-side region.

5. The blade of a gas turbine according to claim 2, wherein the density of openings in the pressure-side region is higher than the density of openings in the suction-side region.

6. The blade of a gas turbine according to claim 3, wherein the density of openings in the pressure-side region is higher than the density of openings in the suction-side region.

7. The blade of a gas turbine according to claim 1, wherein openings of at least three or more back channels arrayed in the circumferential direction are formed in each of the suction-side region and the pressure-side region.

8. The blade of a gas turbine according to claim 1, wherein the flow passage forming plate has:
a suction-side channel that extends along inside of the suction-side end surface to be parallel to the suction-side end surface in a direction having a component of the axial direction and provides communication between the cavity and the back header channel; and
a pressure-side channel that extends along inside of the pressure-side end surface to be parallel to the pressure-side end surface in a direction having a component of the axial direction and provides communication between the cavity and the back header channel,
wherein the communication between the cavity and the back header channel provided by each of the suction side channel and the pressure side channel is provided via respective entry points to the cavity that are located closer to a front end surface of the flow passage forming plate than the back end surface of the flow passage forming plate.

9. The blade of a gas turbine according to claim 8, wherein the flow passage forming plate has:
a gas path surface that connects to the back end surface, the pressure-side end surface, and the suction-side end surface at peripheral edges and comes in contact with the combustion gas; and
a plurality of gas path surface blowout channels that communicate with the back header channel and open in the gas path surface.

10. The blade of a gas turbine according to claim 1, wherein the flow passage forming plate has:
a gas path surface that connects to the back end surface, the pressure-side end surface, and the suction-side end surface at peripheral edges and comes in contact with the combustion gas; and
a plurality of gas path surface blowout channels that communicate with the cavity and open in the gas path surface.

11. The blade of a gas turbine according to claim 9, wherein the gas path surface blowout channels are gradually directed toward the downstream side in the axial direction of the rotor shaft as the plurality of gas path surface blowout channels approach the gas path surface.

12. The blade of a gas turbine according to claim 10, wherein the gas path surface blowout channels are gradually directed toward the downstream side in the axial direction of the rotor shaft as the plurality of gas path surface blowout channels approach the gas path surface.

13. The blade of a gas turbine according to claim 1, wherein the flow passage forming plate having a plurality of blade bodies arrayed in the circumferential direction.

14. The blade of a gas turbine according to claim 13, wherein the density of openings on the back end surface in blade downstream regions is higher than the density of openings on the back end surface in an inter-blade region, the inter-blade region being a region of the middle region that includes a region between two circumferentially adjacent blade bodies, the blade downstream regions being regions of the middle region that are located on the downstream side in the axial direction relative to the blade bodies and do not include the inter-blade region.

15. The blade of a gas turbine according to claim 1, comprising an outer shroud that is formed at an end of the blade body on an outer side in the radial direction, and an inner shroud that is formed at an end of the blade body on an inner side in the radial direction, wherein the outer shroud comprises the flow passage forming plate and the inner shroud comprises an additional flow passage forming plate, and the outer shroud is fixed to a casing of the gas turbine.

16. The blade of a gas turbine according to claim 1, wherein
the flow passage forming plate is a platform that is formed at an end of the blade body on an inner side in the radial direction, and
the platform is fixed to the rotor shaft.

17. A gas turbine comprising:
a combustor in which the combustion gas is generated as fuel is combusted;
a rotor shaft extending in an axial direction;
a blade having a combustion flow passage formed inside the blade, the combustion flow passage having an annular shape around the rotor shaft, and the annular combustion flow passage extending in the axial direction; and
a casing that covers the rotor shaft and the blade,
wherein the blade comprises:
a blade body that is disposed in the combustion gas flow passage through which combustion gas flows, and extends in a radial direction of the rotor shaft; and
a flow passage forming plate that is formed at an end of the blade body in the radial direction of the rotor shaft and defines a part of the combustion gas flow passage,
wherein the flow passage forming plate has:
a back end surface that is an end surface on a downstream side of the forming plate in the axial direction of the rotor shaft in which the combustion gas flows;
a pressure-side end surface that is an end surface on a circumferential pressure side that is a pressure side of the blade body in a circumferential direction around the rotor shaft as a central axis;
a suction-side end surface that is an end surface on a circumferential suction side that is the opposite side from the circumferential pressure side;
a cavity into which cooling air flows;
a plurality of back channels that open in the back end surface; and
a back header channel extending in the circumferential direction along a continuous and uninterrupted wall separating the cavity and the back header channel, the back header channel communicating with the cavity and the plurality of back channels, openings of a plurality of the back channels arrayed in the circumferential direction are formed in each of a middle region of the back end surface that does not include an edge of the suction-side end surface and an edge of the pressure-side end surface, a suction-side region of the back end surface that includes the edge of the suction-side end surface and is adjacent to the middle region in the circumferential direction, and a pressure-side region of the back end surface that includes the edge of the pressure-side end surface and is adjacent to the middle region in the circumferential direction, and a density of openings of the plurality of back channels in the middle region is higher than the density of openings of the plurality of back channels in at least one side region of the suction-side region and the pressure-side region, the density of openings being a ratio of a length of wetted perimeter of the plurality of back channels to an interval of openings of the plurality of back channels.

* * * * *